Feb. 16, 1971     E. H. DINGER     3,564,391

ROTATING ALTERNATING CURRENT GENERATOR SYSTEM

Filed May 9, 1968     8 Sheets-Sheet 1

INVENTOR
EDWARD H. DINGER
BY
HIS ATTORNEY

I—ADVANCED FIRING ANGLE

II—RETARDED FIRING ANGLE

INVENTOR
EDWARD H. DINGER
BY
HIS ATTORNEY

Feb. 16, 1971     E. H. DINGER     3,564,391
ROTATING ALTERNATING CURRENT GENERATOR SYSTEM
Filed May 9, 1968     8 Sheets-Sheet 8

INVENTOR
EDWARD H. DINGER
BY
HIS ATTORNEY

United States Patent Office 3,564,391
Patented Feb. 16, 1971

3,564,391
ROTATING ALTERNATING CURRENT
GENERATOR SYSTEM
Edward H. Dinger, Waynesboro, Va., assignor to
General Electric Company
Filed May 9, 1968, Ser. No. 727,783
Int. Cl. H02p 9/30
U.S. Cl. 322—25         34 Claims

ABSTRACT OF THE DISCLOSURE

A rotating, alternating current generator system is described in which an exciter driven with the generator shaft supplies generator field current as well as the entire field current required by the exciter. D-C field current for the exciter is obtained from the exciter output, rectified by a controlled rectifier unit. Regulation of generator output voltage (or some other variable measurable in the system as a voltage or current) is obtained through control of the firing angle of the controlled rectifier unit, thereby varying the level of exciter field current to adjust for changes in generator output conditions.

To obtain regulation over a wide range of exciter output voltages containing substantial distortion, firing voltage for firing the controlled rectifiers in the controlled rectifier unit is obtained by amplitude-clipping the exciter output voltage at a constant level independent of exciter output amplitude. The firing voltage waveform generator contains a clipping circuit capable of achieving such clipping to the same level for all rectifiers.

The firing voltage waveform generator fires the rectifiers through magnetic core firing circuits. Control of the exciter field current, and thus of a particular system variable (e.g., generator output voltage) is achieved through control of the reset flux produced in the magnetic cores in the firing circuits.

A Manual Regulator Unit is provided for regulating exciter field current to provide constant exciter output voltage. An Automatic Regulator Unit is provided for regulating exciter field current to provide constant generator output voltage. The Automatic Regulator Unit, which includes a non-linear rate feedback loop, includes several regulators, each responsive to a particular system variable for controlling exciter field current in accordance with that variable when its value goes beyond certain predetermined limits, in order to prevent system failure. The individual regulators are connected to control the rectifier unit through an analog OR-gate which passes only that regulator output signal having the greatest amplitude. The regulators in the Automatic Regulator Unit are: (1) the Main Control Regulator; (2) the Undervoltage Limit Regulator; (3) the Current Limit Regulator; (4) the Underexcited Reactive Current Limit Regulator; and (5) the Phase-Back Limit Regulator.

For preventing collapse of exciter self-excitation, a Current Boost Rectifier Unit is provided for maintaining minimum exciter field current under predetermined conditions which otherwise might result in such collapse. Particularly high reliability is achieved by providing two independent exciter field current supplies and by providing a selective failure circuit for preventing failure in one such supply from adversely affecting the other.

BACKGROUND OF THE INVENTION (I) Field of the invention

This invention relates to rotating, alternating current generator systems. In particular, an embodiment will be described in which an A-C generator is provided with field current by an exciter driven with the generator shaft. In generating systems of this type one or more regulators are ordinarily connected in feedback loops for maintaining generator output voltage (or some other measurable variable) at a predetermined desired value irrespective of generator load conditions.

(II) History of the prior art

In the early 1950's, when generator output requirements were generally under two hundred thousand kilovolt amperes (k.v.a.) and when exciter output power for the field of the generator was only a few hundred kilowatts (kw.), regulators for generating systems generally utilized magnetic amplifiers, and excitation was usually provided by commutator exciters. As generator output power requirements increased, generator field current requirements became increasingly greater, leading to the need for exciters capable of supplying the high output power, and new regulating devices and techniques for handling the higher power levels involved. Over the last several years, there has been an increasing use of small A-C generators or alternators, as exciters, and these have supplied D-C generator field current through the use of diode full-wave rectifiers.

Primarily because a relatively stable (i.e., controlled) source of field current for the exciter was required, exciter field current was derived either (a) from an independent source of power available at the generating station, or (b) from the generator output, which necessarily was regulated. In the first case, the system was at the mercy of the external power source: it failed if the external source failed. In the second case, the existence of short circuit or near short circuit conditions at the generator output could and in fact did often result in generator failure.

In certain generator systems, exciter output has been used to provide part of the required exciter field current; the remainder was provided by an amplidyne or similar device which derived power from one of the sources (a) or (b) mentioned above, usually from an independent source. Such systems were therefore subject to failure from the causes described above. It has not heretofore been possible to supply the entire exciter field current requirement from the exciter itself because of the difficulty of controlling the widely varying exciter output voltage to provide the desired level of exciter current, at any given time, and because of the many system conditions under which a completely self-excited system of this nature would tend to fail due to collapse of the self-excitation loop.

Thus, if exciter output voltage were used to supply exciter field current, any load condition which transiently short-circuited the exciter terminals would tend to cause system failure. In those partially self-excited systems in which amplidyne-type generators have been used to supply the remaining required exciter field current, the self-excited component has usually been provided through diode rectifier units. Control of exciter field current through regulation of the firing angles of controlled rectifiers has not been feasible, because it is necessary to provide a firing or control signal for such rectifiers which is in-phase with their anode voltages. Provision of such a firing signal has not heretofore been possible because no voltage existed in the system which was sufficiently in-phase with the exciter output voltage (and thus anode voltage) except the exciter output voltage itself, which was too widely varying and contained too much distortion to properly fire the rectifiers. For example, it is not unusual for exciter output voltage to vary in amplitude by 4:1 under normal conditions and by as much as 8:1 under abnormal circumstances. Further, the exciter output waveform is highly distorted by commutation of the diodes in the generator field current rectifier.

A further disadvantage of previous systems of this general type, in which part of the exciter field current requirement is supplied by the exciter itself through diode rectifier units (i.e., full-wave diode bridge rectifiers) has been that complete failure of the rectifier units, and therefore of the entire system, may result from failure of a single diode. In certain systems, two rectifier units have been provided so that one may be serviced while the other continues to supply all of the field current required by the system. Normally, both rectifier units operated in the system in parallel. Even with two such rectifier units, however, failure of a single diode in one rectifier unit can cause the fuses for all the diodes in both rectifier units to blow, taking the generator system out of service.

While previous systems had other drawbacks which are avoided by the generator system described herein, an understanding of these problems and their solutions in accordance with the present invention may best be left for description later on.

SUMMARY OF THE INVENTION

According to the invention, a rotating, alternating current generator system is provided which is highly reliable and which is capable of operating under a wide variety of load conditions while maintaining virtually constant generator output voltage (or, if desired, generator field current). The generator system includes a rotating, alternating current generator, and a rotating, alternating current exciter which supplies generator field current as well as the entire required exciter field current under all conditions. Both the generator and the exciter may be virtually any type of rotating, A-C generator, and in fact both may be the same type of generator. For purposes of description, however, the unit applying ultimate output voltage is referred to herein as a "generator," while that supplying generator field current will be referred to as an "exciter."

Exciter self-excitation (i.e., exciter field current) is provided from the exciter output terminals through at least one controlled rectifier unit, which supplies direct current to the exciter field at a level determined by its firing angle, or phase angle. Control of the exciter field current, and thus indirectly of generator output voltage, is achieved by regulating the rectifier unit firing angle. The firing waveform for the rectifier unit is derived from the exciter output, since that output carries the necessary phase information. While the embodiment described herein is a three-phase system, the invention is applicable to any n-phase system. In order to control the rectifier unit firing angle, in spite of the wide amplitude variation and high distortion content of the exciter output, a special clipping circuit is provided for clipping all phases of the exciter output waveform at a constant amplitude, independent of exciter amplitude.

Control of the firing angles of the rectifiers in the rectifier unit is achieved through control of the reset voltage applied to magnetic cores in each rectifier firing circuit. This reset voltage is supplied at the output of the particular regulator in control of the system.

Two regulator units are provided in the generating system according to the invention: an Automatic Regulator Unit for controlling exciter field current to provide a constant generator output voltage, and a Manual Regulator Unit for controlling exciter field current to provide constant exciter output voltage.

The Automatic Regulator Unit includes several regulators, namely (1) a Main Control Regulator; (2) an Undervoltage Limit Regulator; (3) a Current Limit Regulator; (4) an Underexcited Reactive Current Limit Regulator; and (5) a Phase-Back Limit Regulator. Each regulator is responsive to a particular variable, in the form of a measurable current or voltage in the generator system, for regulating the rectifier unit firing angle (and thereby exciter current) to bring its associated variable to a desired level. Normally, the Main Control Regulator controls exciter field current to provide constant generator output voltage. Each of the remaining regulators acquires control of the system under conditions where its associated variable deviates further from an associated reference level than is permissible for stable system operation. Takeover by the proper regulator under particular circumstances is achieved by feeding the outputs of all of the regulators to the rectifier control circuits through one or more analog OR-gates, which pass only the regulator output signal having the greatest amplitude. In this manner, the system is controlled in accordance with that system variable which deviates (relatively) furthest from its desired reference level at any given time.

In previous systems, impedance networks were provided for permitting auxiliary regulators to affect the output under certain conditions. By providing one or more analog OR-gates for determining which regulator has control of the system, simplification of the various regulators is achieved in many cases, thereby improving the reliability and reducing the cost of the generator system as a whole.

The regulators in the Automatic Regulator Unit function in the following manner:

The main Control Regulator compares the generator output voltage with a fixed internal standard and feeds back a correction signal to the controlled rectifier unit for adjusting exciter field current in such direction as will maintain the generator output voltage constant;

The Current Limit Regulator acts to limit exciter output current to a maximum value corresponding to a predetermined maximum generator field current. The Current Limit Regulator thus prevents overdriving the generator field even though such overdrive may be called for during transient conditions by the Main Control Regulator;

The Undervoltage Limit Regulator takes control of the exciter field current whenever that current might otherwise go below a value necessary to sustain exciter self-excitation. It acts to maintain a minimum exciter output voltage, preventing collapse of the system;

The Underexcited Reactive Current Limit Regulator senses the reactive current supplied by the generator and takes over from the Main Control Regulator to maintain sufficient exciter field current for that level of reactive current. Underexcited reactive current is thus prevented from increasing above a predetermined level, over which the generator may pull out of step;

The Phase-Back Limited Regulator sets a fixed maximum phase-back (or maximum retard phase angle) for the controlled rectifier unit, thereby assuring proper inversion of the unit when it is called upon to supply reverse output voltage. The controlled rectifier unit supplies reverse output voltage during those periods when it is desired to lower the exciter field current level more rapidly than would otherwise be permitted by the time constant of the exciter field.

According to a particularly advantageous embodiment of the invention, two independent controlled rectifier units are provided for supplying exciter field current, such that the system may operate with either or both such rectifier units. According to the invention, provision is made for selective failure of the controlled rectifier units, should one or more rectifiers be short-circuited. Thus, while failure of a single rectifier may cause the blowing of all fuses associated with rectifiers in the same rectifier unit, such failure is precluded from interfering with the action of the remaining rectifier unit, which is capable of supplying the entire exciter field current requirement.

In one embodiment of the invention, a Current Boost Rectifier Unit is connected in series with each controlled rectifier unit, for supplying exciter field current when exciter output voltage is insufficient for that purpose. The Current Boost Rectifier Unit, which derives power through current transformers in the exciter output circuit, becomes operative to supply exciter field current only when the exciter current transfer function (i.e., exciter output current divided by exciter field current) falls below a predetermined threshold level necessary to maintain proper excitation.

As previously mentioned, exciter field current is controlled by regulating the firing angles of the controlled rectifiers (SCR's) in the controlled rectifier unit. According to the invention, a novel firing circuit is provided for controlling the firing angle of each SCR. The firing circuit includes a magnetic core, the flux level of which is changed in one direction by the regulator output voltage, to reset the core; the flux level is then changed in the opposite direction by the firing voltage, and firing occurs due to an impedance change in the firing circuit when the magnetic core saturates. In accordance with the invention, each firing circuit contains a unilateral switch for setting a minimum firing voltage level, thus assuring that all SCR's fire properly. Firing voltage is provided by a firing voltage waveform generator, which incorporates a special clipping arrangement for clipping all three phases of exciter output voltage at a fixed level independent of exciter output amplitude and distortion content. A clipping circuit clips the waveforms produced by each phase transformer by clipping the full-wave rectified outputs, connected in parallel, of signals on separate secondary windings of each phase transformer. This results in highly uniform clipping of the outputs from all of the remaining phase transformer secondary windings, which supply firing voltage to the various SCR firing circuits. Other features of the invention will become apparent from consideration of the specific embodiments described herein.

BRIEF DESCRIPTION OF THE DRAWINGS

Particular embodiments of the invention will be described with reference to the accompanying drawings, in which.

DESCRIPTION OF THE PREFERRED EMBODIMENTS

Figure 1:
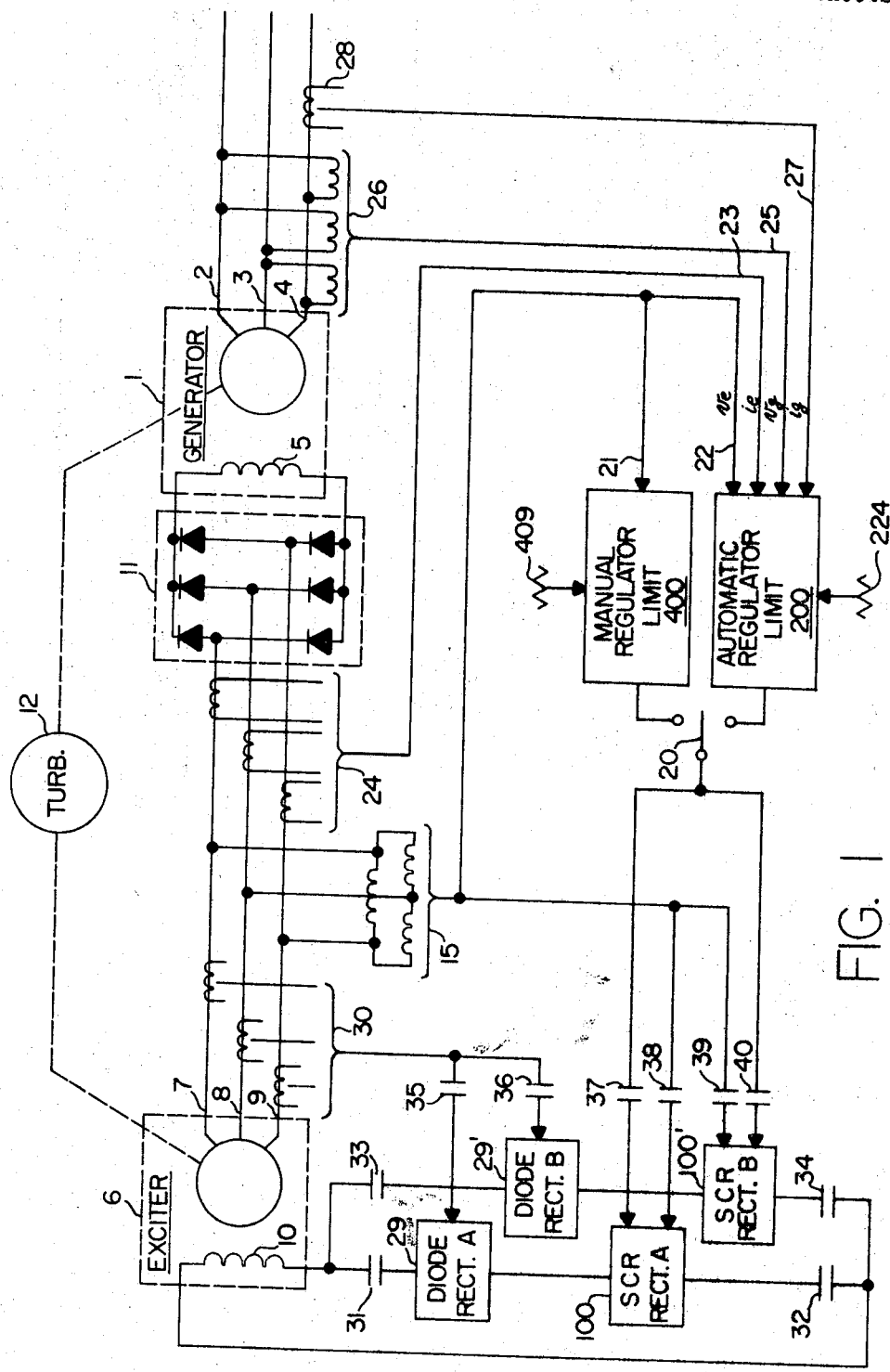
FIG. 1 is a block diagram of a rotating, alternating current generator system in accordance with this invention.

CONTENTS (1.0) OVERALL GENERATING SYSTEM
    (1.1) Automatic and Manual Regulator Units
    (1.2) Selective Redundancy Circuit
(2.0) AUTOMATIC REGULATOR UNIT
    (2.1) Main Control Regulator
    (2.2) Undervoltage Limit Regulator
    (2.3) Current Limit Regulator
    (2.4) Underexcited Reactive Current Limit Regulator
    (2.5) Phase-Back Limit Regulator
(3.0) MANUAL REGULATOR UNIT
(4.0) CURRENT BOOST RECTIFIER UNIT
(5.0) CONTROLLED RECTIFIER UNIT
    (5.1) Firing Circuit
    (5.2) Firing Voltage Waveform Generator (1.0) OVERALL GENERATING SYSTEM The block diagram of FIG. 1 shows the overall generating system of the embodiment of the invention herein described. The generating system is a 3-phase system and includes a generator 1 having output terminals 2, 3 and 4 corresponding to the three phases of the generator output, and a generator field winding 5, the current in which determines the voltage at the generator output terminals under any given load conditions. Generator field current is supplied by an exciter 6 having output terminals 7, 8 and 9 corresponding to the three phases of the exciter output and a field winding 10, the current in which determines the exciter output voltage and, consequently, the generator field current and thus the generator output voltage.

As previously stated, the gnerator and exciter are both rotating, alternating current generators and may in fact be the same type of unit, except for size. In this embodiment, the generator is a large three-phase generator and the exciter is a three-phase alternator of sufficient size to supply generator field current as well as its own field current under all conditions. Present requirements for generating systems include output voltages on the order of a million k.v.a., necessitating exciters having output current capacities on the order of 20,000 amperes.

The system includes exciter field current supply means connected between the exciter output terminals and the exciter field winding for supplying the entire current in the exciter field winding from the exciter output terminals.

In particular, the exciter output is rectified by a three-phase, full wave, diode bridge rectifier 11, and the D-C current at the bridge output is supplied to the generator field winding. The shafts of both the exciter and generator are driven in common by a turbine 12.

Control of the generating system is obtained by controlling the exciter field current; since this is the system input, in this embodiment, the exciter field winding may be referred to as the generating system input winding. Exciter field current is supplied from the exciter output terminals through controlled rectifier units 100 and 100', each of which full-wave rectifies the three-phase exciter output and supplies a controllable portion of it in the form of D-C current to exciter field winding 10. Exciter output voltage for the exciter field is supplied to the controlled rectifier units 100, 100' through three-phase output voltage transformers 15 indicated schematically. For reasons which will be explained later (section 1.2), two separate three phase voltage output transformers are provided, each connected to supply current to one of the two rectifier units 100, 100'.

The controlled rectifier units 100 and 100' are identical, and each contains a three-phase ful wave silicon controlled rectifier (SCR) bridge circuit. For purposes of clarity, each bridge circuit (and its associated firing circuit) is referred to herein as a "controlled rectifier unit," while the individual SCR's in each unit are referred to as controlled rectifiers. Firing circuits for each SCR are included in each rectifier unit, and each firing circuit controls the firing angle, or phase angle, of the SCR under its control in accordance with a regulator signal applied to all of the firing circuits by either the Automatic Regulator Unit 200 or the Manual Regulator Unit 400

(1.1) Automatic and Manual Regulator Units

The Automatic Regulator Unit 200 maintains the voltage at generator output terminals 2, 3 and 4 constant at a value determined by the setting of control potentiometer 224 under the wide variety of load conditions encountered in operation of the system. The Manual Regulator Unit regulates the exciter output voltage to provide constant generator field current, at a value determined by the setting of control potentiometer 409. Either the Automatic Regulator Unit or the Manual Regulator Unit may be connected to control the generating system by selection switch 20. To avoid undesirable transients upon changeover between automatic and manual regulation, a voltmeter (not shown) may be connected between the output of the Manual and Automatic Regulator Units to facilitate zeroing any differential between their output voltages under the particular load conditions existing before actuating switch 20.

To perform their regulating functions, the Manual and Automatic Regulator Units require feedback of various measurable variables in the generating system. Exciter output voltage is fed back to the input 21 of Manual Regulator Unit 400 and may be derived from the same voltage transformers 15 which supply exciter field current, or from a separate transformer.

The inputs to the Automatic Regultor Unit are voltages proportional to the exciter output voltage $v_e$ (input 22); the exciter output current $i_e$ (input 23, derived through current transformers 24); the generator output voltage $v_g$ (input 25, derived through voltage transformers 26); and the generator output current $i_g$ (input 27, derived through current transformer 28). Each feedback variable is derived through a voltage or current transformer (indicated schematically in FIG. 1), and each input is three-phase except for input 27 for which only one phase is necessary. If desired, three-phase generator current feedback may be used, in order to reduce any ripple which may result from phase imbalance.

For maintaining exciter current under certain conditions (see section 4.0) current boost rectifier units 29 and 29' are provided in series with controlled rectifier units 100 and 100', respectively. The current boost rectifier units feed back, under certain conditions, current derived from the exciter output through current transformers 30 (one for each unit) into the exciter field winding.

(1.2) Selective Redundancy Circuit

Any generator system must for obvious reasons be highly reliable, and should be capable of undergoing routine maintenance while continuing to supply output power, without being shut down. For this reason, certain generating systems of a type similar to this one have been provided with redundancy circuitry in the form of two independent input field winding current supplies. Provision was made for operating the system with either or both current supplies, and switches were provided for connecting each supply in the system. Thus, the system could operate with one current supply while the other was switched out of the system for repairs and maintenance.

In previous systems of this type, failure of one rectifier in either rectifier unit was capable of causing failure of the entire system, so that the generator had to be taken off-line. In order to prevent system failure as a result of failure of a single rectifier (or even of an entire rectifier unit, sufficient impedance is provided between rectifier units 100 and 100' to prevent a short circuit in one unit from short circuiting the remaining unit. By this means failure of one rectifier causes selective failure of other rectifiers, selective in the sense that only rectifiers in the same unit are selective for failure. Failure in this sense usually means blowing out the fuse (or activating the circuit breaker) associated with each individual rectifier.

Impedance is placed between rectifier units 100 and 100' by providing separate transformers for supplying exciter output voltage to the rectifier units, one for unit 100 and one for unit 100'. These are shown schematically, for clarity, as transformer 15 in FIG. 1. It is required that the impedance between the secondary windings of the two transformers be high enough to prevent a short circuit across one such secondary winding from lowering the impedance seen by the other secondary winding enough to blow the rectifier fuses in the unit supplied by that secondary winding.

For connecting either or both of the rectifier units 100 and 100' (and their associated current boost units 29 and 29') into the exciter field circuit, switches 31 through 40 are provided to selectively isolate each rectifier unit from all input signals. Such switches are conventional, and may be controlled from a central control panel, where other generating system controls are located.

(2.0) AUTOMATIC REGULATOR UNIT

Figure 2:
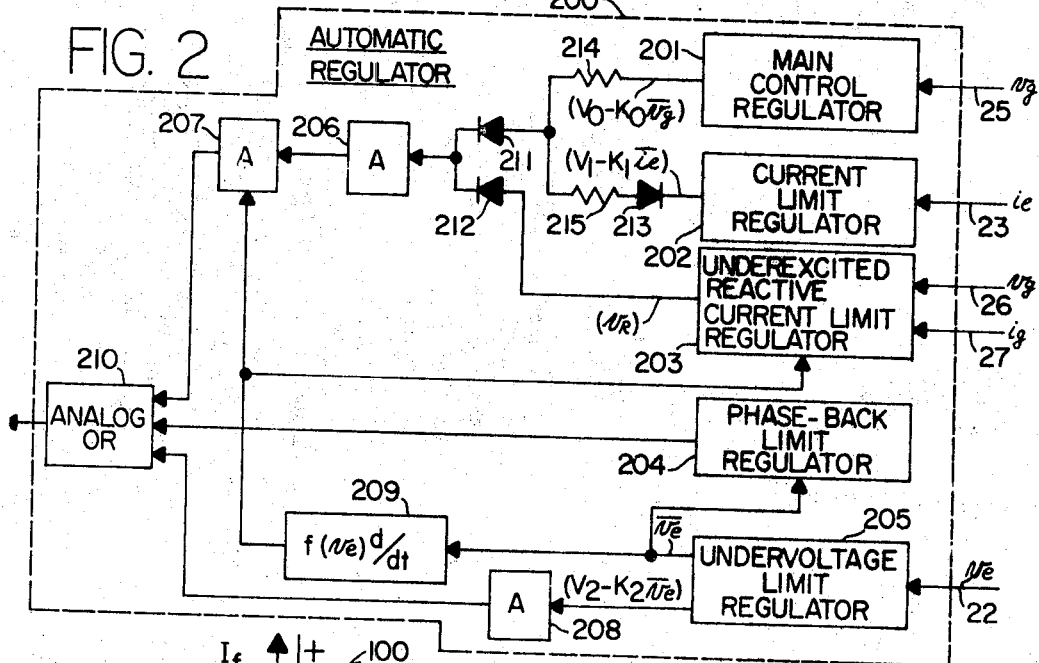
FIG. 2 is a block diagram of the Automatic Regulator Unit shown in the block diagram of FIG. 1.
Figure 3:
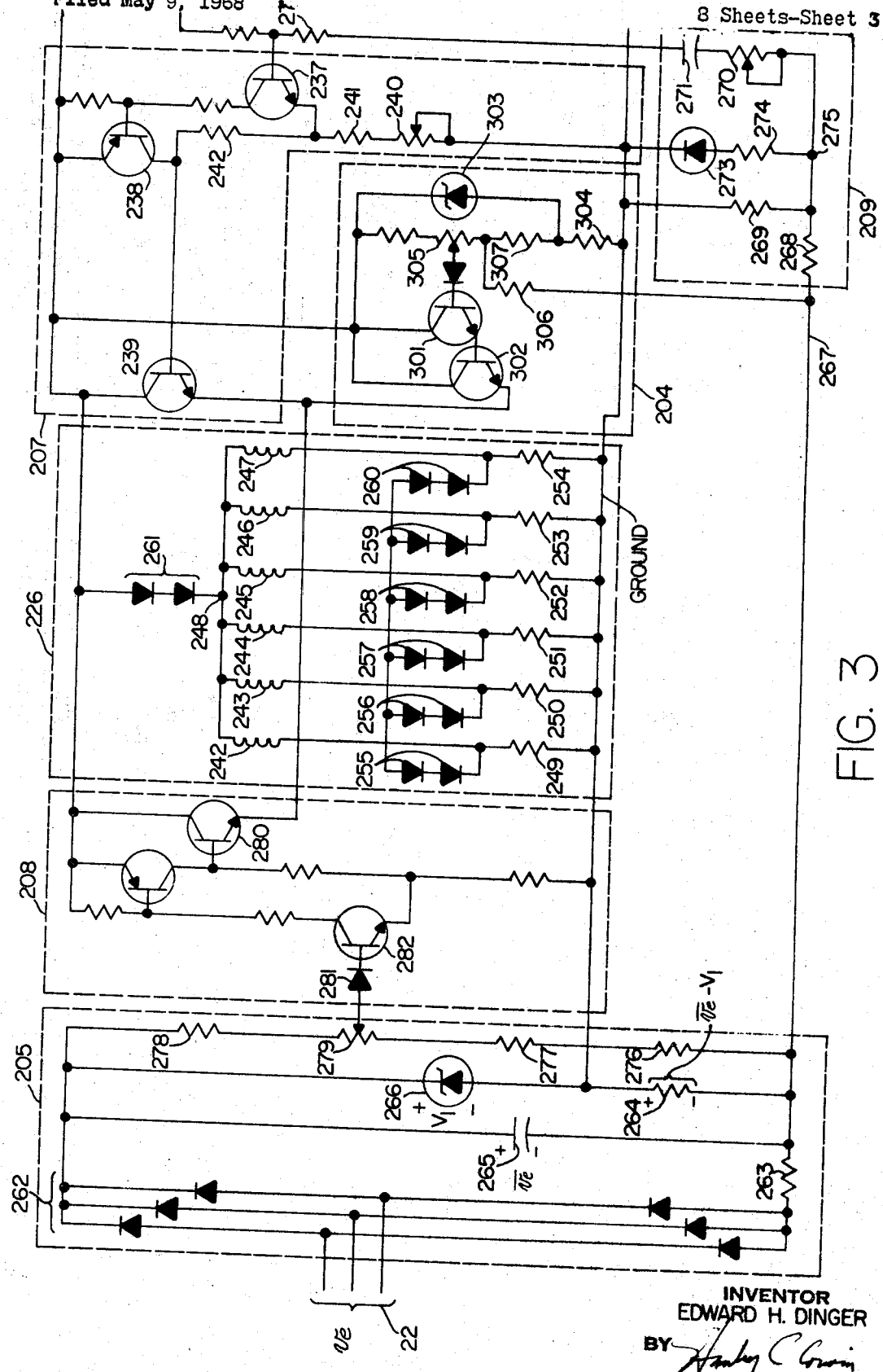
FIG. 3 and FIG. 4 are a composite schematic circuit diagram showing the circuit of the Automatic Regulator Unit.
Figure 4:
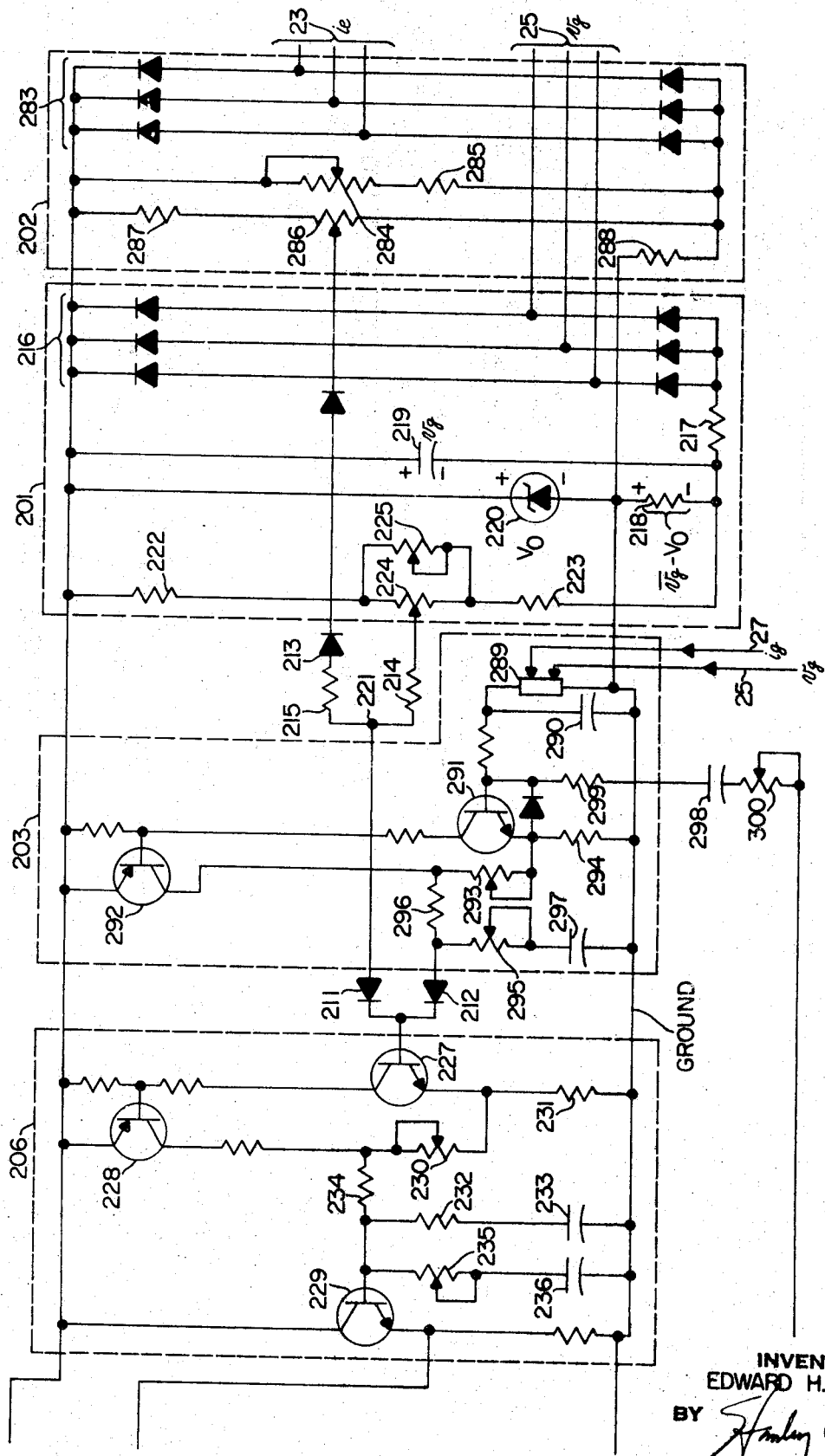

Automatic Regulator Unit 200 is shown in the block diagram of FIG. 2 and in greater detail in composite FIGS. 3 and 4. From the block diagram of FIG. 2, it can be seen that the Automatic Regulator Unit (A.R.U.) contains a plurality of regulators, specifically Main Control Regulator 201; Current Limit Regulator 202; Underexcited Reactive Current Limit Regulator 203; Phase-Back Limit Regulator 204; and Undervoltage Limit Regulator 205.

The function of the A.R.U. is to provide an output voltage for controlling the phase of the controlled rectifier units 100 and 100' to maintain constant generator output voltage $v_g$, and exactly this function is performed by the main control regulator 201. However, certain conditions arise under various circumstances of operation of the generating system, during which regulation solely to obtain constant output voltage would result in generator system malfunction of one sort or another. Consequently, the remaining regulators are connected in the A.R.U. such regulators automatically take over control of the rectifier units 100 and 100' (and thus of the system) during certain predetermined conditions.

The operation and function of each of the individual regulators will be described in detail in one of the following sections. In addition to the five regulators, the A.R.U. contains amplifiers 206, 207 and 208, a nonlinear rate feedback circuit 209 and analog OR-gate 210, as well as certain diodes and resistors. While the operation of these elements will be better understood after the operation of the regulators has been explained, a brief description of their operation is warranted at this point.

Figure 5:
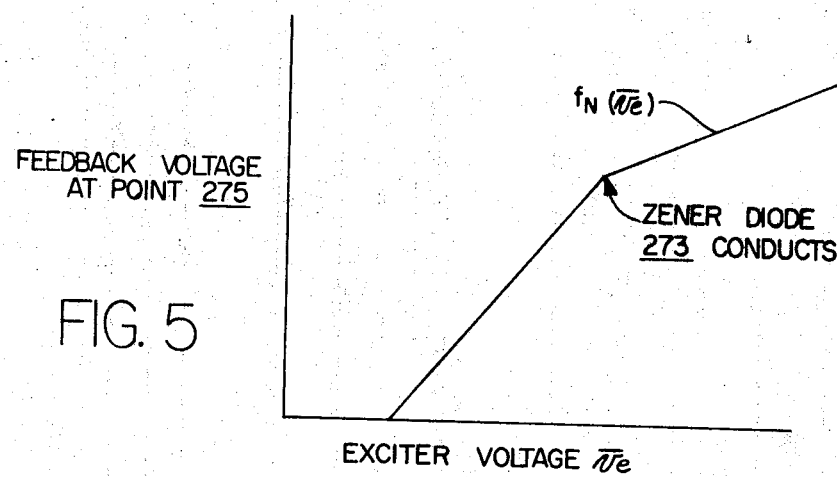
FIG. 5 is a graph illustrating the operation of the nonlinear rate feedback circuit.

For stability in the regulation loop, negative rate feedback (i.e., a voltage proportional to the time-derivative of the exciter output voltage) is fed back at certain points in the regulation loop, namely, amplifier 207 and the underexcited reactive current limit regulator. Studies have indicated, however, that feedback of the time-derivative of the exciter output voltage may not be adequate to maintain stability under all conditions of system operation. Consequently, rate feedback circuit 209 includes a circuit for multiplying the exciter voltage rate signal by a non-linear function of the average exciter output voltage, $f_N(\bar{v}_e)$, as shown in FIG. 5, to be described later. Corrections of the rate feedback signal by this means eliminates any possibility of system instability.

Each of the various regulators is required to take over control of the generating system when the particular variable sensed by is (and which it causes to assume control of the system) is more out-of-line than the variables associated with all of the remaining regulators. Stated another way, each regulator must assume control of the system if and when its associated variable deviates relatively further from its prescribed value (and thus causes a larger correction signal) than the remaining variables used for regulation. Recognizing this, it has been found that substantial simplification of the entire regulating apparatus, including the individual regulators, in comparison with similar prior regulation circuits, is obtained by connecting the regulators to the rectifier unit firing circuits through an analog OR-gate 210. By this means, increased reliability is achieved in the A.R.U., as well as lower cost. The analog OR-gate operates to pass only the regulator output signal having the greatest amplitude, at any given time. Principally to avoid duplication of amplifiers, Main Control Regulator 201 and Underexcited Reactive Current Limit Regulator 203 are connected through diodes 211 and 212, respectively, which together similarly comprise an analog OR-gate.

Primarily because the relationship between the outputs of regulators 201 and 202 desired to bring regulator 202 into control of the system is different in sense from that which will actuate the analog OR-gate described, a slightly different gate is provided for interconnecting these two regulators. That is, diode 213 is connected in the output of regulator 202 such that regulator 202 is effective when its output drops below that of the Main Control Regulator 201. The gate thus formed by diode 213 may nevertheless be broadly considered as an analog OR-gate, since it essentially passes only one of two analog signals applied to it. Regulator 202 does not take complete control from regulator 201, since the outputs of both are passed through resistors 214 and 215. However, when diode 213 is forward biased, since $R_{215}$ is substantially greater than $R_{214}$ regulator 202 is primarily in control of the generating system.

It is thus clear that the generator system includes a plurality of regulators each, responsive to a respective measurable variable within the system for producing a control signal in accordance with that variable. The generator system further includes at least one analog OR-gate for supplying to the control terminals of the controlled rectifier units that one of the control signals which has the greatest amplitude.

(2.1) Main Control Regulator

Main Control Regulator 201 is in control of the generating system under normal conditions, that is, most of the time. From FIG. 4 it is seen that the generator three-phase output voltage at input 25 is applied to a three-phase full-wave diode bridge circuit rectifier 216. The rectified output of bridge rectifier 216 is applied across an averaging circuit containing resistors 217 and 218 and capacitor 219. The values of resistors 217 and 218 are chosen such that the current in resistor 217 is continuous, and does not contain any of the discontinuities of the individual diode currents. This assures that $\bar{v}_g$, a voltage proportional to the average generator output voltage, appears across capacitor 219. Zener diode 220 provides a constant voltage reference $V_o$. Thus rectifier 216 (1) provides D-C power for the regulator, including amplifiers 203, 206, 207 and 208; (2) provides constant reference voltage $V_o$ at Zener diode 220; and (3) supplies generator output feedback voltage $\bar{v}_g$.

For purposes of analysis, consider ground to be the voltage appearing at the negative side of Zener diode 220. The Main Control Regulator output voltage at point 221, with respect to ground, may then be derived as follows: The voltage $\bar{v}_g$ across capacitor 219 appears across resistors 222 and 223 and potentiometers 224 and 225. A portion of this voltage with respect to the negative side of capacitor 219, say $K'\bar{v}_g$, is tapped off by potentiometer 224 where $0<K'<1$. The voltage across resistor 218 is then $\bar{v}_g - V_o$. The sum of these two voltages is the output voltage to ground at point 221, and is $$K'\bar{v}_g - (\bar{v}_g - V_o) = V_o - (1-K')\bar{v}_g$$

Defining a new constant $K_o = 1-K'$, $0<K_o<1$, the Main Control Regulator output voltage is $V_o - K_o\bar{v}_g$.

This output voltage is amplified by amplifiers 206 and 207 and applied to the input of analog OR-gate 210, which is incorporated into the controlled rectifier unit reset circuit 226 in FIG. 3. Amplifier 206 is a two stage amplifier including transistors 227 and 228 (the latter in a feedback loop) in its first stage, and transistor 229 as a second stage emitter follower. The gain of the first stage is, to an approximation $$\frac{R_{230} + R_{231}}{R_{231}}$$

and is highly stable and virtually independent of changes in transistor characteristics. Resistor 232 and capacitor 223 constitute a small ripple filter, and resistor 234, variable resistor 235 and capacitor 236 form a series stabilization circuit for compensating the overall feedback loop gain to improve stability. Preferably, the values of resistors 234 and 235 are made small in relation to the input impedance of emitter follower transistor 229, so that changes in the gain of the latter do not affect the behavior of the stabilization circuit. The system has been found to operate properly under most conditions even without the last mentioned stabilization circuit.

The output of amplifier 206 is fed to the input of amplifier 207, which includes transistors 237 and 238 in a first stage and transistor 239 as a second stage emitter follower. The first stage of amplifier 207 is identical to that of amplifier 206 except that the stage gain is adjustable by varying the variable resistor 240 in the emitter circuit of transistor 237, rather than variable resistor 230 in the amplifier feed back path. The gain of the first stage of amplifier 207 is approximately $$\frac{R_{242} + R_{241} + R_{240}}{R_{241} + R_{240}}$$

and is highly stable, being virtually independent on variations in gain of the individual transistors.

The output from Main Control Regulator 201, amplified by amplifiers 206 and 207, appears across each of reset windings 242 through 247 which, although shown for purposes of explanation as being in Automatic Regulator Unit 200, are actually located in one of controlled rectifier units 100, 100'. Each reset winding controls the phase angle of a corresponding controlled rectifier by controlling the reset of its associated magnetic core. The emitter of transistor 239 is connected to control terminal 248, and the voltage at that point appears across all of the parallel load resistors 249 through 254, connected in series with the respective reset windings 242–247 through diode pairs 255 through 260. The reset windings are connected in common through diode pairs 261 to the collector of a transistor 239.

Figure 13:
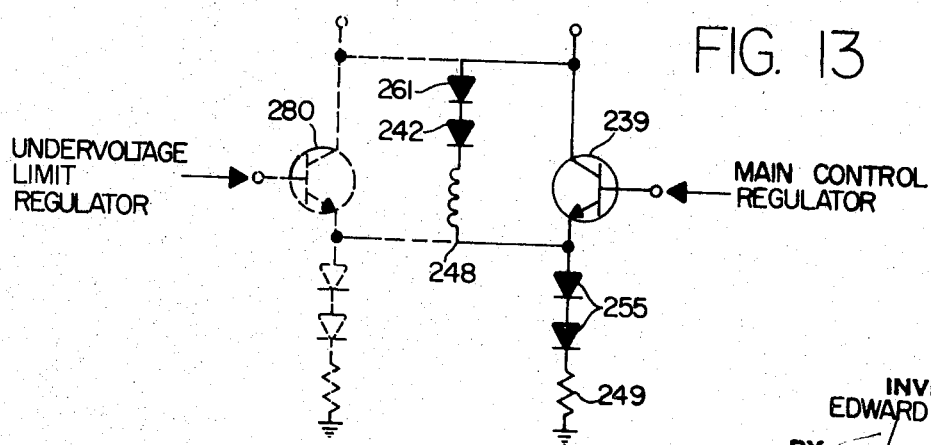
FIG. 13 is a circuit diagram illustrating the operation of an analog OR-gate.

One of the reset windings 242 and its associated load resistor 249 are shown in FIG. 13, which illustrates how reset control is achieved.

FIG. 13 (solid-line portion) illustrates clearly how the output collector-to-emitter voltage on transistor 239 is clamped across reset winding 242 (as well as the remaining rest windings); the higher this voltage, the further the magnetic core driven by the reset winding will be reset and, consequently, the lower the resultant rectifier output voltage will be.

Returning to FIGS. 3 and 4, assume the generator load increases, causing a drop in generator output voltage $v_g$ at input 25 of Main Control Regulator 201. The regulator output at point 221 (which is $V_o - K_o \bar{v}_g$) increases, raising the output voltage of amplifiers 206 and 207 (and thus the voltage across load resistors 249–254) and consequently lowering the voltage appearing across reset windings 242–247. This lessens the reset of each rectifier (actually, the reset flux change in the magnetic core associated with the rectifier), increasing its firing angle to provide higher exciter field current and, consequently, higher generator output voltage, thus tending to correct the initial drop. An increase in generator output voltage produces a control voltage at point 248 tending to correct rectifier firing angle in the opposite direction.

Stabilization of the regulation loop is provided by non-linear rate feedback to amplifier 207, as described earlier. Referring to FIG. 3, exciter output voltage $v_e$ is fed back to input 22 of Undervoltage Limit Regulator 205 and is rectified by a three-phase, full-wave diode rectifier bridge 262. The bridge output voltage is applied across an averaging circuit containing resistors 263 and 264 and capacitor 265. This circuit is similar to that at the output of rectifier bridge 216, and resistors 263 and 264 are chosen to that the current in the former is continuous, whereby a voltage $\bar{v}_e$ proportional to the average exciter output voltage appears across capacitor 265.

Zener diode 266 sustains a constant voltage $V_1$, so that a voltage $\bar{v}_e - V_1$ appears across resistor 264 in the direction indicated. Recalling that "ground" has been defined as the voltage at the positive side of resistor 264, the voltage from input 267 of feedback circuit 209 to ground is $-(\bar{v}_e - V_1) = V_1 - \bar{v}_e$. The voltage divider formed by resistors 268 and 269 applies a portion of this voltage through variable resistor 270, capacitor 271 and resistor 272, which differentiate the applied voltage $V_1 - \bar{v}_e$, so that $-d\bar{v}_e/dt$, the desired negative rate feedback, appears at the base of transistor 237 in amplifier 207.

The voltage divider ratio changes to lower the amplitude of the rate feedback voltage applied to transistor 137 when Zener diode 273 goes into conduction, thereby placing resistor 274 in parallel with resistor 269 in the voltage divider. The reverse-bias voltage across Zener diode 273 is the voltage divider ratio times $\bar{v}_e - V_1$. Thus the amplitude of the feedback signal at input 267 is lowered when $(v_e - V_1) > V_{zb}$, the Zener breakdown voltage; i.e., when $\bar{v}_e > (V_1 + V_{zb})$. This is illustrated in FIG. 5 showing $f_N$, a plot of the voltage at point 275 (to ground) as a function of exciter output voltage $\bar{v}_e$. Variable resistor 270 may be varied to adjust the rate of feedback to a desired level.

The rate of feedback actually supplied to transistor 237, then, is proportional to $$-\frac{d}{dc}[-\bar{v}_e f_N(\bar{v}_e)]$$

This feedback signal is proportional to the time derivative of the product of exciter output voltage and a non-linear function of exciter output voltage which decreases in slope above a predetermined exciter output voltage, for maintaining the stability of the generator system under all operation conditions.

(2.2) Undervoltage Limit Regulator

Because exciter field current is suplied by the exciter itself (i.e., the exciter is self-excited) it is essential to guarantee that the exciter output voltage $v_e$ remains above a minimum level necessary to sustain self-excitation. Thus during a transient condition such as rejection by the generator of an external load, generator output voltage may jump upward causing the Main Control Regulator to phase back the rectifier units to such an extent that exciter output voltage—which is used to provide anode voltage for the rectifiers—may not be availavle when the regulator calls for higher exciter field current. Undervoltage Limit Regulator 205 (FIGS. 2 and 3) is connected at its input 22 to the exciter output voltage $v_e$, and temporarily takes control of the system when $v_e$ tends to drop too low, relinquishing control automatically when the Main Control Regulator again calls for a safe level of exciter field current.

As previously described with respect to the non-linear rate feedback circuit, bridge rectifier 263 in Undervoltage Limit Regulator 205 provides a voltage $\bar{v}_e$ proportional to average exciter output voltage across capacitor 265. Again recalling that ground potential for the amplifiers, including amplifier 208 at the output of regulator 205, is at the positive side of resistor 264, the input to amplifier 208 with respect to ground may be derived as follows: With respect to the negative side (as indicated) of resistor 264, the input to amplifier 208 is at a voltage, $K'' \bar{v}_e$, where $0 < K'' < 1$ is a constant representing the voltage divider ratio of resistors 276, 277 and 278 and potentiometer 279. Similarly, the voltage at ground with respect to the negative side of resistor 264 is $\bar{v}_e - V_1$, where $V_1$ is the voltage across Zener diode 266. The regulator output voltage with respect to ground is therefore $$K''\bar{v}_e - (\bar{v}_e - V_1) = V_1 - \bar{v}_e(1 - K'')$$
$$= V_1 - K_1\bar{v}_e; \quad 0 < K_1 < 1 = 1 - K''$$

This voltage is amplified by amplifier 208, which is a two stage amplifier similar to amplifiers 206 and 207, the second stage being an emitter follower consisting of transistor 280. The emitter of transistor 280 is connected to point 248, the input terminal of the analog OR-gate. A diode 281 is connected in the amplifier input to prevent damage to transistor 282 if the amplifier input voltage transiently becomes too negative.

A drop in exciter output voltage $v_e$ results in raising the input voltage $(V_1 - K_1\bar{v}_e)$ at amplifier 208, and thus its output voltage, applied at point 248 across the rectifier unit reset windings. To better understand how Undervoltage Limit Regulator 205 takes control from the Main Control Regulator 201, consider again FIG. 13, where output transistor 280 in amplifier 208 is shown in dotted lines as it appears across reset winding 242 in parallel with output transistor 239 driven by the Main Control Regulator. Whichever transistor (239 or 280) calls for the highest voltage at point 248 to ground determines the voltage at that point—and thus the control voltage across reset winding 242—back biasing the emitter-base junction of the other transistor. Thus where the exciter voltage becomes too low relative to the generator output voltage, the signal at the base of transistor 280 (from the Undervoltage Limit Regulator) becomes greater than that at the base of transistor 239 (from the Main Control Regulator), causing the reset voltage across winding 242 to follow the emitter of transistor 280. Thus, the Undervoltage Limit Regulator is in complete control of the system. When exciter output voltage again rises to an acceptable level, the Main Control Regulator again assumes control of the system. By adjusting the voltage gain (e.g., by adjusting a potentiometer) of each of the regulating loops relative to the others, the takeover condition for that regulator is determined.

(2.3) Current Limit Regulator

Under certain circumstances, such as when the generator output terminals approach a short circuit condition, the Main Control Regulator may call for increasingly higher exciter field current. Since no correspondingly high exciter output voltage can correct the short circuit condition at the generator terminals, the result of this condition may be a buildup of generator field current beyond the rated limit of the generator field winding.

In order to prevent this condition from occurring, Current Limit Regulator 202 (FIGS. 2 and 4) is provided for limiting the maximum field current which can be produced in the generator field winding.

Current Limit Regulator 202 includes a three-phase, full-wave diode bridge rectifier 283, the input 23 to which is a voltage proportional to exciter output current, i.e., derived through three-phase current transformers 24. Bridge rectifier 283 is loaded by load resistors 284 and 285, and a portion of the output voltage determined by the setting of potentiometer 286 and by the value of resistor 287 is tapped off and applied to point 221, when diode 213 conducts.

Since power for the Automatic Regulator Unit amplifiers is derived from the generator output voltage, and because this voltage is likely to be too low to provide such power when the Current Limit Regulator is called into play, provision is made to supply power from the Current Limit Regulator. For this purpose, rectifier 283 is connected through resistor 288 across Zener diode 220 (which controls amplifier supply voltage) in parallel with rectifier 216.

The output of regulator 202 with respect to amplifier ground (at the negative side of Zener diode 220) may be shown to be $V_o - K_2 \overline{i_e}$; $0 < K_2 < 1$ where $\overline{i_e}$ is the average value of the voltage at the terminals of rectifier bridge 283, which is proportional to the voltage at input 23. (Note that in each case the value of the system variable represented by $i_e$, $v_e$, $v_g$, etc., is not its actual value, but a proportional voltage provided at the associated regulator input terminals through coupling transformer.)

Potentiometer 286 and variable resistor 284 are adjusted so that under normal operating conditions the output voltage of the Current Limit Regulator is sufficiently positive to reverse bias diode 213, permitting diode 213 to be forward biased only when the exciter output current (and thus the generator field current) exceed a predetermined maximum value. This limit value may conveniently be set at about 120–140% of maximum rated generator field current.

Thus when exciter output current becomes high enough to cause a drop in Current Limit Regulator output voltage below the voltage at point 221 set by the Main Control Regulator, diode 213 becomes forward biased and the Current Limit Regulator obtains control of the system. Resistor 215 is made much smaller than resistor 214, so that when diode 213 is forward biased, point 221 follows the Current Limit Regulator output voltage.

(2.4) Underexcited Reactive Current Limit Regulator

Underexcited Reactive Current Limit (U.R.C.L.) Regulator 203 (FIGS. 2 and 4) is provided for assuming control of the generating system when the reactive component of generator output current tends to become too large with respect to generator excitation—a condition which may cause the generator to pull out-of-step with other generators on the same line. U.R.C.L. Regulator 203 includes a circuit 289 which receives as inputs voltages proportional to the generator output voltage and current, on any generator phase, and produces a D-C signal proportional to the reactive current component in the generator output. Such circuits are well known in the art. The output of circuit 289 is filtered by a capacitor 290 and fed to the input of an amplifier consisting of transistors 291 and 292, the latter in a feedback loop for rendering the amplifier gain stable and relatively insensitive to changes in transistor characteristics. The gain of the U.R.C.L. amplifier is, to an approximation, $$\frac{R_{293} + R_{294}}{R_{294}}$$

(Note: As used herein, the notation $R_n$ means the resistance value of resistor $n$.)

Diodes 211 and 212 act as an analog OR-gate for the outputs of the Main Control Regulator (or the Current Limit Regulator) and the U.R.C.L. Regulator, permitting the latter to assume control of the system when its output, appearing at the anode of diode 212, is greater than the signal at the anode of diode 211. The takeover point may be set by adjusting the level of the output voltage from circuit 289.

For stabilization, a series stabilization circuit consisting of variable resistor 295, resistor 296 and capacitor 297 (which may be identical to the stabilization circuit consisting of elements 234, 235 and 236 in amplifier 206) is connected in series with the output of the U.R.C.L. amplifier. In addition, a negative, non-linear rate feedback signal is fed to the base of transistor 291; the exciter output voltage signal $\overline{v_e}$, multiplied by the non-linear function $f_N$ (see graph of FIG. 5) is obtained from point 275 (FIG. 3) and is differentiated by capacitor 298 and applied to the base of transistor 291 through resistor 299. The amplitude of the rate feedback signal may be set by variable resistor 300.

(2.5) Phase-Back Limit Regulator

To fully understand the function of Phase-Back Limit Regulator 204 (FIGS. 2 and 3) it must be recognized that the rectifier units which supply D-C field current to the exciter field winding may, under certain conditions, invert to supply negative output voltage. Such inversion is desirable in order to reduce exciter field current more rapidly, on command of a regulator unit, than the long time constant of the exciter field would otherwise permit.

Figure 9:
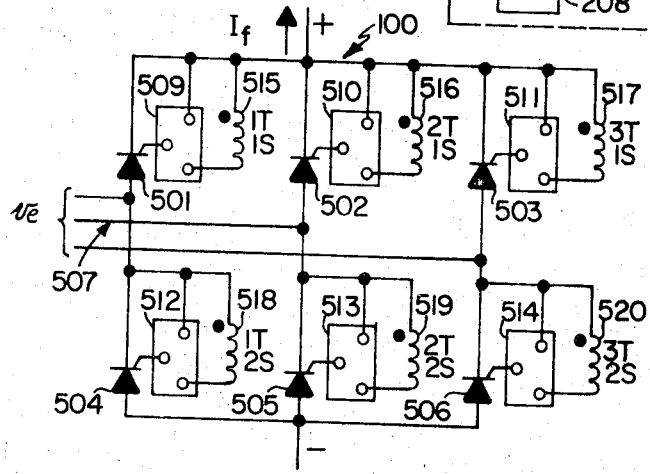
FIG. 9 is a schematic diagram showing the interconnection of a firing circuit such as is shown in FIG. 10 with each controlled rectifier in the controlled rectifier unit.
Figure 14:
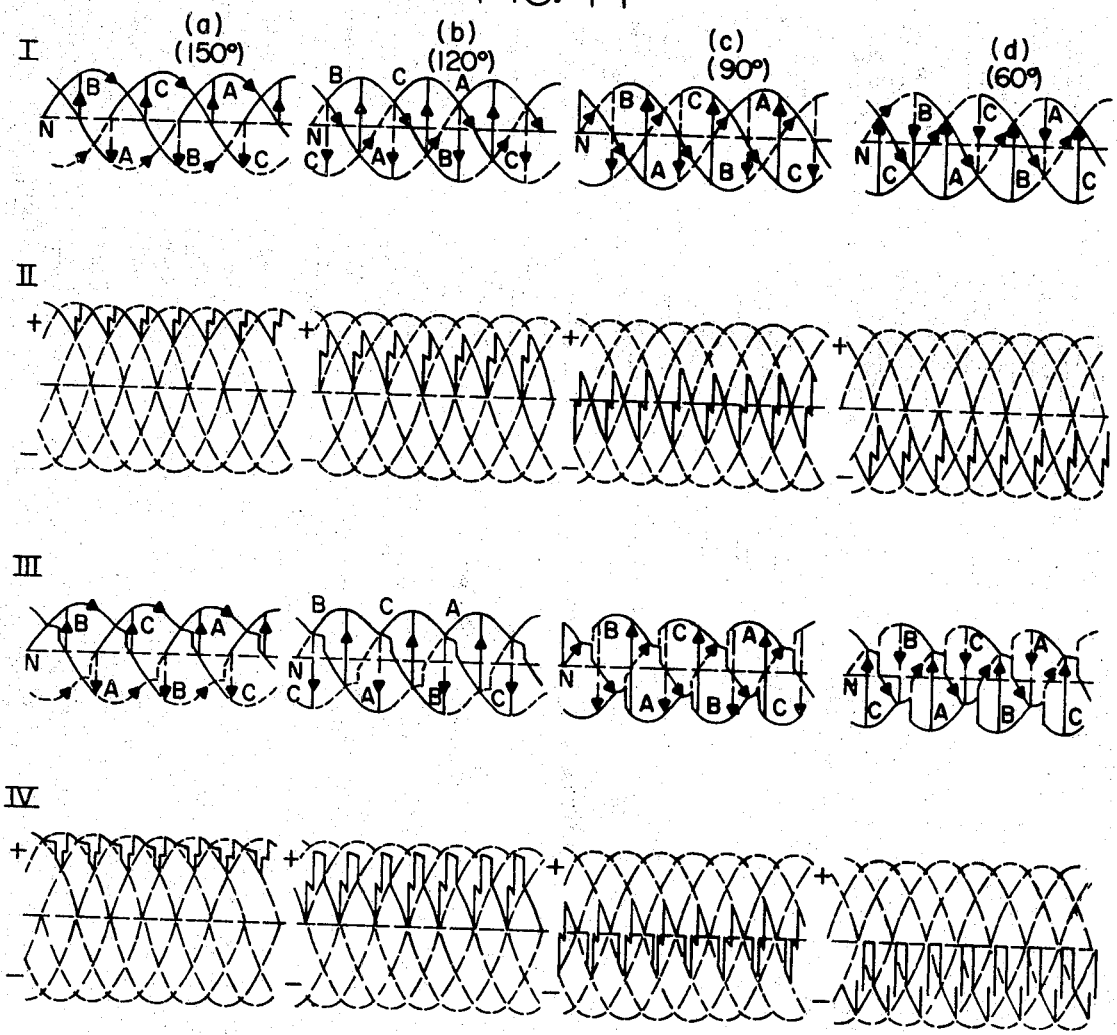
FIG. 14 is a plot of the controlled rectifier unit output voltage illustrating the D-C output for different firing angles and the distortion therein due to commutation of the diodes in the generator field rectifier.

Normally, a controlled rectifier bridge circuit can produce an output voltage of only one sense, that is, positive or negative. However, when such a bridge circuit is operating into a large inductive load, for retarded firing angles, forward current in each individual controlled rectifier (in this case, an SCR) is maintained by the load—even though the anode voltage goes negative—until the next SCR in the firing sequence picks up its load current. This condition continues as long as forward current is maintained in the load. The effect of this is illustrated in FIG. 14, where the individual phase-to-neutral voltage waveforms (ΦA, ΦB, ΦC) of an SCR bridge circuit such as that of FIG. 9 are shown, for different firing angles, assuming that the bridge circuit is loaded with a large inductance through which current $I_t$ flows. The arrows in the waveforms I indicate the particular phase waveforms followed by the bridge output terminals.

The bridge output waveforms corresponding to the phase angles indicated at (a), (b), (c) and (d) are shown in waveforms II. By examination, it is clear that the average voltage at the output of the bridge (across the load) at a 90° firing angle is zero volts, and that at further retarded firing angles, e.g., 60° in II–(d), the average bridge output voltage is negative. The negative voltage output during bridge inversion in this manner is automatically called for by the Automatic Regulator Unit in attempting to rapidly bring down high exciter field currents under certain conditions. However, because inversion is caused by the peculiar timing of the SCR's taking over load current sequentially from one another, it can be seen that if the SCR's are permitted to phase back all the way to 180°, there will be no such sequential takeover and thus no inversion, for the rectifier will be acting as a diode bridge rectifier. Actually, inversion failure occurs at a firing angle of slightly less than 180°.

Hence, to assure that inversion occurs when called for by the Automatic Regulator Unit, a Phase-Back Limit Regulator is provided for limiting the phaseback, or reset, of the rectifier units to less than about 165–170°, thus preventing inversion failure.

Phase-back limiters are not new; previous ones have operated by generating a turn-on pulse every cycle, for each SCR, at the phase-back limit angle, say, 165°. If the regulator called for a lower firing angle, the turn-on pulses had no effect, for each SCR had fired before the pulse arrived. However, if the regulator called for turn-on at a phase angle greater than 165°, the turn-on pulse at 165° would fire the SCR. Thus the rectifiers could never fire at angles larger than the phase-back limit angle, preventing inversion failure.

The circuits and generators required for producing such turn-on pulses in previous systems have been relatively complex, expensive and difficult to adjust, as will be apparent from even a brief consideration of their required functions. In part because the present system utilizes analog OR-gates for interconnecting the various regulators; a particularly advantageous Phase-Back Limit Regulator is provided according to the present invention which is relatively simple, inexpensive, reliable and adjustable.

As shown in FIGS. 2 and 3, Phase-Back Limit Regulator 204 includes two transistors 301 and 302 connected as a Darlington pair, with the emitter of transistor 302 connected along with the emitters of transistors 239 and 280 to point 248, the input of the analog OR-gate. Zener diode 303 in series with resistor 304 provides a constant voltage, a portion of which is tapped from potentiometer 305 and applied to the base of transistor 301. The negative feedback voltage appearing at input 267 to rate feedback circuit 209 is fed through a resistor 306 connected between resistor 307 and potentiometer 305. Neglecting for a moment the effect of the negative feedback voltage through resistor 306, it will be seen that the output voltage at the emitter of transistor 302 with respect to ground is, by virue of Zener diode 303, a constant under all circumstances. This voltage sets a maximum phase-back limit angle by setting a minimum voltage at point 248. If the particular regulator in control of the system calls for a lower voltage at point 248 than the minimum voltage set by regulator 204, the latter will take control of the system.

It will become clear later, from a consideration of the firing voltage waveform, that if a constant voltage is maintained at the output of regulator 204, the phase-back angle will tend to advance somewhat at higher levels of exciter output voltage. In order to compensate for this effect, and to maintain the phase-back limit angle constant independently of exciter output voltage, a small amount of feedback is provided through resistor 306. In this manner, the Phase-Back Limit Regulator is responsive to exciter output voltage for producing a D-C control signal corresponding to a constant maximum firing angle of the controlled rectifier units for all values of exciter output voltage (i.e., the source of voltage for the controlled rectifier units).

(3.0) MANUAL REGULATOR UNIT

Figure 6:
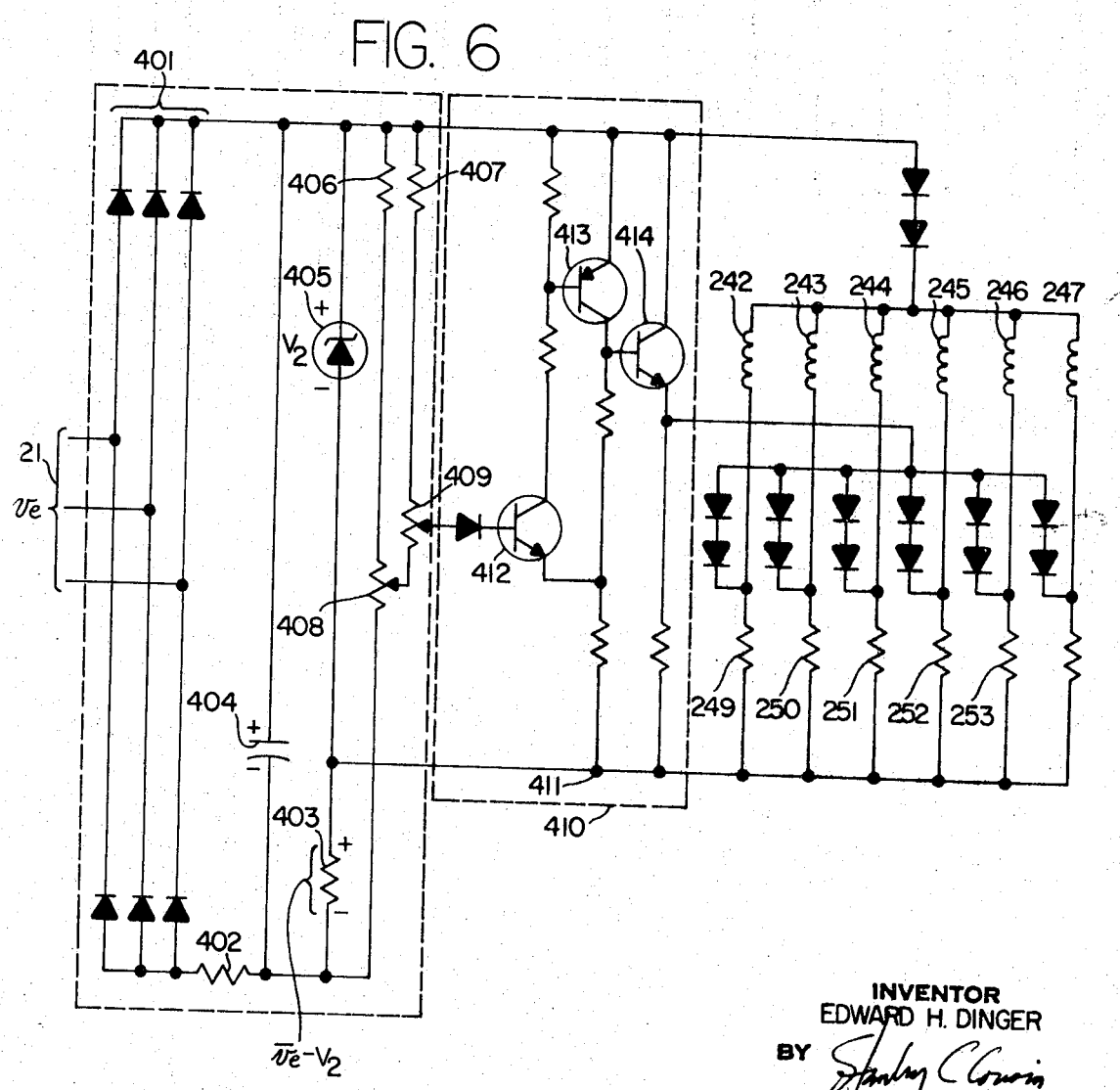
FIG. 6 is a circuit diagram of the Manual Control Unit.

Manual Regulator Unit 400, which may be switched into the system via switch 20 in place of the Automatic Regulator Unit, regulates rectifier unit phase angle, and thus exciter field current, to provide constant exciter output voltage under varying load conditions. For this purpose the Manual Regulator Unit (FIG. 6), which is similar to Undervoltage Limit Regulator 205, includes a three-phase full-wave diode bridge circuit 401, the input 21 to which is the exciter output voltage, derived from transformers 15 (FIG. 1). The output voltage from rectifier 401 is applied across an averaging circuit consisting of resistors 402 and 403 and capacitor 404. The values of resistors 402 and 403 are chosen so that the current in the former is continuous, assuring that a voltage proportional to the average bridge output voltage (and thus proportional to average exciter output voltage) appears across capacitor 404. A constant voltage $V_2$ appears across Zener diode 405, so that the voltage across resistor 403, in the sense indicated, is $\bar{v}_e - V_2$. A portion of the voltage $\bar{v}_e$ across capacitor 404 is tapped off by an impedance network consisting of resistors 406 and 407 and potentiometers 408 and 409 thus the voltage applied to the input of amplifier 410, with respect to ground terminal 411 of that amplifier, is $V_2 - K_2\bar{v}_e$.

Like the other amplifiers previously described, amplifier 410 includes a first stage constituted by transistors 412 and 413, the latter providing negative feedback, and a second emitter follower stage constituted by transistor 414. This amplifier has no provision for gain adjustment, since its input is sufficiently adjustable by virtue of potentiometers 408 and 409. Potentiometer 409 sets the desired level of exciter output voltage maintained by the Manual Regulator Unit, while potentiometer 408 may be used to set the maximum possible alternator output voltage achievable by varying potentiometer 409. The Manual Regulator Unit is in full control of the generating system, and the output voltage at the emitter of transistor 414 is applied through switch 20 (FIG. 1) to the reset windings in the controlled rectifier unit. It can be seen that an increase in exciter output voltage will cause a drop in the voltage at the input to amplifier 410, thus lowering the reset voltage applied to the controlled rectifier unit and increasing the SCR firing angles to boost exciter field current, thereby tending to correct the assumed drop in exciter output voltage.

(4.0) CURRENT BOOST RECTIFIER UNIT

Because, according to the present invention, exciter field current is derived from the output of the exciter itself, conditions may arise during operation of the generating system causing collapse of this self-excitation loop. For example, under certain conditions the exciter output terminals tend to become a short circuit, reducing anode voltage in the controlled rectifier units to such an extent that sufficient current is not available in the exciter field winding to sustain exciter operation.

Such a condition may for example result from a short circuit at the generating terminals, which could momentarily induce enough forward current in the generator field winding to place the generator field current rectifier 11 in the short circuit mode, reducing exciter output voltage to zero. Another such condition may be caused by generator full load rejection, which might cause the Main Control Regulator to phase back the controlled rectifier units far enough to cause collapse of the excitation system. This might happen despite the existence of the Undervoltage Limit Regulator 205.

Figure 7:
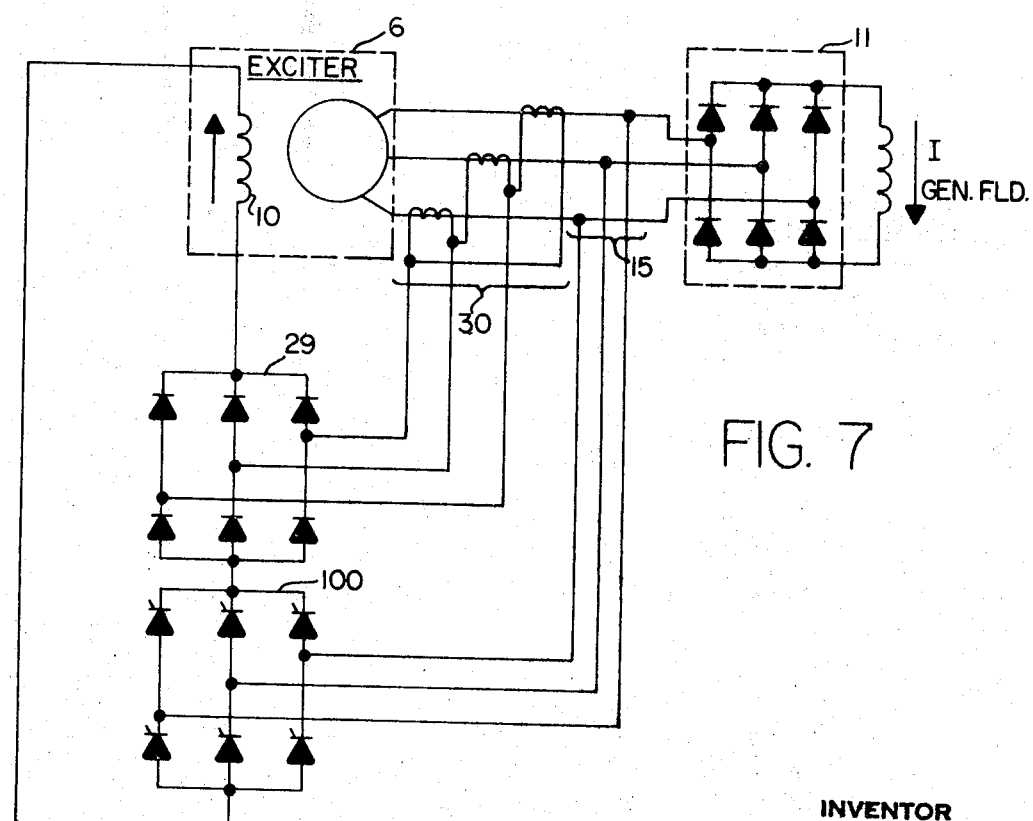
FIG. 7 is a schematic circuit diagram of part of the generator system illustrating the sources of exciter field current, and in particular the Current Boost Rectifier Unit.

To avoid failure under the above or analogous circumstances, Current Boost Rectifier Units 29 and 29' are connected in series with respective Controlled Rectifier Units 100 and 100' for providing D-C booster current to the exciter field winding proportional to exciter output current. As shown in FIG. 7, Current Boost Rectifier Unit 29 (unit 29' is identical) derives power from current transformer 30 in the exciter output circuit, whereas Controlled Rectifier Unit 100 derives power from voltage transformer 15 across the exciter output terminals. The primary windings of current transformer 30 are connected in series with the exciter output terminals, and the transformer turns ratio is made such that the D-C booster current supplied to the exciter field winding is proportional to exciter output current in the proportion 1: $m$, $m$ being such that the booster current is less than the exciter field current necessary to produce that level of exciter output current except when the exciter output voltage drops below a level necessary for the maintenance of exciter self-excitation.

It will be noted that under conditions which may cause self-excitation failure, exciter output voltage is very low, while exciter output current is relatively high. The Current Boost Rectifier Unit utilizes the high alternator output current existing under these conditions to boost alternator field current for as long as necessary to prevent excitation collapse.

Figure 8:
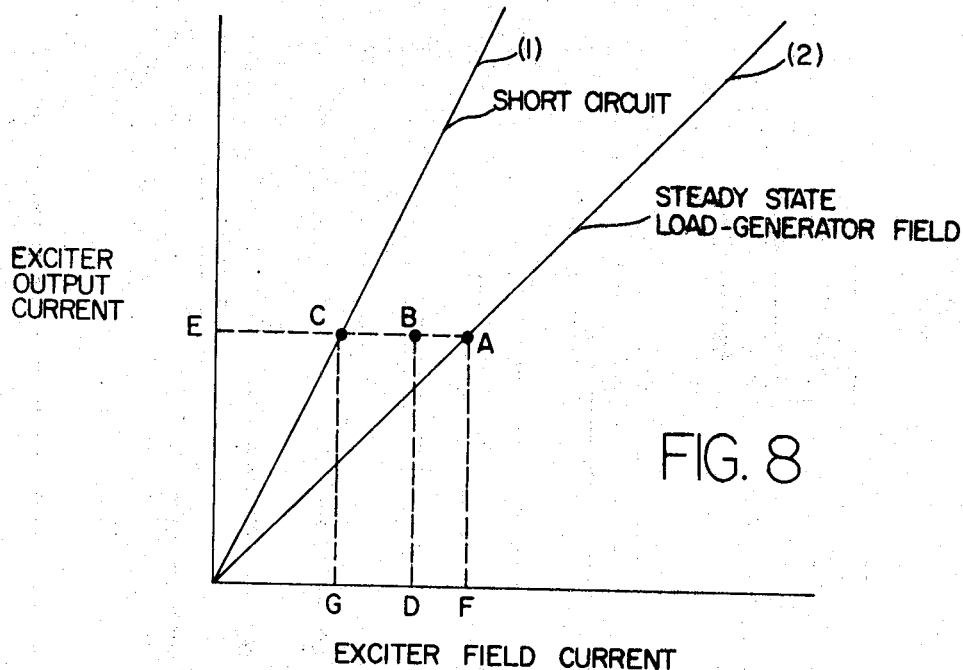
FIG. 8 is a graph illustrating the operation of the Current Boost Rectifier Unit.

FIG. 8 is a graph of exciter output current as a function of exciter field current under two limit conditions. The condition represented by curve (1) is that of a short circuit at the alternator output. The other limit condition represented by curve (2) is the steady state load, at the alternator output terminals, of the generator field.

Current Boost Unit 29 is a three-phase, full-wave diode bridge circuit. The turns ratios of transformers 30, which supply current to unit 29, are chosen such that for any point A on the steady state load curve (2) in FIG. 8, the current produced at the output of Current Boost Rectifier Unit 29 (OD) is less than the field current required (OF) to supply exciter output current (OE). At the same time, the turns ratio of transformers 30 is selected such that, in addition to fulfilling the last-mentioned requirement, the Current Boost Unit output current produced under short circuit conditions (curve (1)) for the same exciter output current, is greater than the exciter field current (OG) required to supply the exciter output current.

Selection of the turns ratio of current transformers 30 in accordance with the above requirements assures that under steady state conditions, Controlled Rectifier Unit 100 will supply the entire exciter field current requirement, fully forward biasing the diodes in unit 29. Under such circumstances, the only effect of Current Boost Rectifier Unit 29 will be to produce a resistance equal to that of the forward biased diodes in the unit in the exciter field circuit. However, whenever the actual operating curve [somewhere between curves (1) and (2) in FIG. 8] goes to the left of point B, the Current Boost Rectifier Unit will supply exciter field current. The gain of the current feedback path thus formed is greater than 1, so that exciter field current will continue to increase until transformers 30 saturate. These transformers are designed to saturate at a point where the Current Boost Rectifier Unit is supplying rated full load field current to the exciter field. Note that when Controlled Rectifier Unit 100 ceases to supply exciter field current, two of its rectifiers will be conducting and will remain conducting throughout the period of operation of Current Boost Unit 29.

It will be apparent that, depending upon the actual turns ratio selected for the Current Boost Unit transformers 30, the unit will take over control of the exciter field, maintaining excitation therein for transient load conditions considerably less extreme than short circuit.

(5.0) CONTROLLED RECTIFIER UNIT

Controlled rectifier unit 100 (unit 100' is identical), as shown in FIG. 9, contains six Silicon Controlled Rectifiers (SCR's) 501 through 506 arranged in a three-phase, full-wave bridge circuit. Three-phase input to the rectifier unit is supplied over input conductors 507 which are connected to the exciter output terminals through one of the three-phase voltage transformers 15. This three-phase input is rectified by the rectifier unit to produce a D-C field current $I_f$ which is fed directly to the exciter field winding 10, as shown in FIG. 1.

Each of the SCR's 501 through 506 conducts current when its anode-to-cathode voltage is positive and when a positive voltage has been applied between its control terminal (508 in the case of SCR 501) and its cathode of sufficient amplitude to fire the SCR. Firing voltage is provided for each SCR by respective firing circuits 509 through 514, and each firing circuit includes two inputs, a reset input (not shown), and a firing voltage input in the form of a secondary transformer winding (515 through 520) in the firing voltage waveform generator.

As previously explained, FIG. 14–I shows the input voltage to each of the three phases, with respect to neutral; the arrows indicate the segments of these waveforms followed by the unit output terminals. FIG. 14–II shows the recifier unit terminal voltage corresponding to each of the source voltage waveforms directly above it; graphs I and II are for four firing angles. The waveforms in column (a) show the respective voltages for an advanced firing angle of 150°, resulting in approximately seven-eighths of the maximum positive D-C output voltage, as shown in II(a). The graphs in column (b) show the same waveforms for a firing angle of 120°, at which angle approximately one-half the maximum positive D-C output voltage is present. This is illustrative of a typical operating condition of the rectifier unit. The graphs in column (c) illustrate the rectifier output for a relatively retarded firing angle of 90°, and it can be seen by inspection that the average D-C output voltage is zero. Recalling that these waveforms show output voltage with the large inductive load of the exciter field winding connected at the rectifier output terminals, the graphs in column (d) show the output voltage for a further retarded firing angle of 60°, at which angle the terminal voltage is approximately one-half its maximum negative D-C value. In this condition, the bridge is said to be "inverting." FIGS. III and IV correspond to FIGS. I and II except that the rectifier unit input voltages are distorted by commutation of the diodes in generator field current rectifier 11 (FIG. 1).

(5.1) Firing circuit

All of firing circuits 509–514 in FIG. 9 are identical. Each firing circuit comprises (1) a series circuit including a variable impedance, a load resistor, a secondary winding of the firing voltage waveform generator, and a diode for permitting current flow in the series circuit only in one direction; (2) a firing resistor for applying firing voltage developed across the load resistor to the controlled rectifier associated with the firing circuit; (3) a unilateral switch (specifically a 4-layer diode) connected between the load resistor and the firing resistor for preventing the voltage across the load resistor from appearing across the firing resistor until said voltage exceeds the breakdown voltage of the unilateral switch; and (4) a capacitor connected in parallel with the load resistor for providing a current surge upon firing of the controlled rectifier to improve its rise time, upon firing. The variable impedance is an inductor magnetically coupled to a square hysteresis-loop magnetic core, to which is also coupled one of the reset windings (e.g., 242–247) for producing a reset flux in the magnetic core in accordance with the D-C control voltage produced by a regulator. In the series circuit (1), above, the firing voltage waveform generator secondary winding and the diode together form a source of unipolar firing voltage in-phase with the anode voltage supplied to the controlled rectifier.

Figure 10:
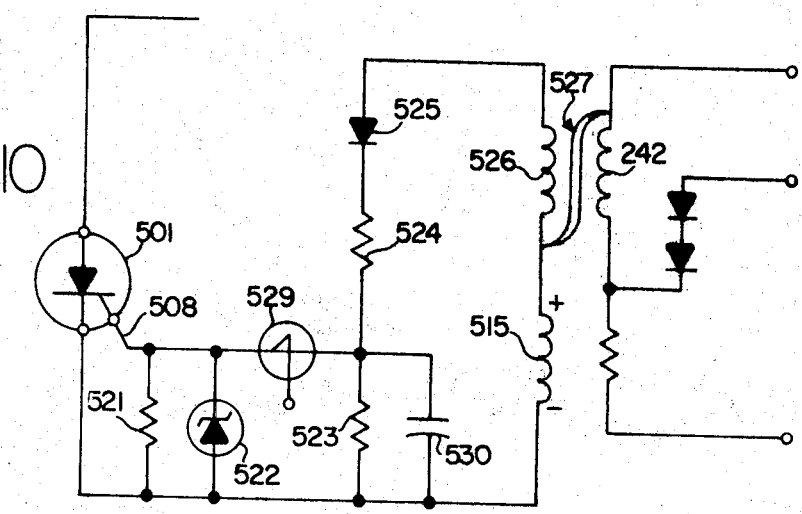
FIG. 10 is a circuit diagram of a firing circuit for a controlled rectifier.

Firing circuit 509 is shown in FIG. 10 connected between control terminal 508 and the cathode of SCR 501. Firing voltage for firing SCR 501 is developed across a firing resistor 521, in parallel with which is a Zener diode 522 for setting a maximum firing voltage level, in order to prevent damage to the SCR. Firing voltage is developed across load resistor 523 in series with resistor 524, diode 525, a secondary winding or inductor 526, which constitutes part of a variable impedance, and secondary winding 515 of the associated phase transformer in the firing voltage waveform generator (to be described). Reset winding 242 is magnetically coupled to magnetic core 527 (indicated schematically by a square hysteresis loop). The voltage across reset winding 242, applied by the regulator controlling the generator system determines as will be seen the extent of reset of magnetic core 527.

The firing circuit operates in the following manner: The firing voltage waveform generator produces a clipped firing voltage waveform 528 shown in FIG. 12(a), which appears across the transformer secondary winding 515 connected in the firing circuit. Assume that magnetic core 527 is saturated, i.e., it is at point A on the B-H curve of FIG. 12(f)–I. A negative half-cycle of the firing voltage waveform of FIG. 12(a) now appears across transformer secondary winding 515. Since this back-biases diode 525, it has no effect on the firing circuit. During this half-cycle, however, D-C regulator output voltage appears across reset winding 242, changing the flux level in magnetic core 527 away from saturation, as shown in FIG. 12(f), to point B. Magnetic core 527 is made large enough so that the maximum regulator voltage applied at reset winding 242, over a half-cycle of the firing waveform, falls substantially short of saturating the core in the opposite direction from point A [FIG. 12(f)]. As the firing voltage waveform appearing across transformer secondary winding 515 goes positive, current flows through winding 526, diode 525, and resistors 524 and 523. The last-mentioned resistors have resistance values such that the firing voltage produces a voltage across resistor 523 substantially less than that required to fire SCR 501, when magnetic core 527 is unsaturated. This current flow in winding 526 drives the flux level in magnetic core 527 in the opposite direction, through point C and back towards point A [FIG. 12(f)]. When magnetic core 527 saturates, the impedance across winding 526 drops by at least an order of magnitude, causing a sudden jump in the current through load resistor 523 and thus in the voltage across it. As soon as the voltage across load resistor 523 exceeds the forward threshold voltage of four-layer diode 529, the resistance of diode 529 drops essentially to zero and the firing voltage across load resistor 523 appears across firing resistor 521, and, consequently SCR 501 goes into conduction. Capacitor 530 provides a supply of turn-on current for SCR 501, thereby improving its turn-on time.

Figure 12:
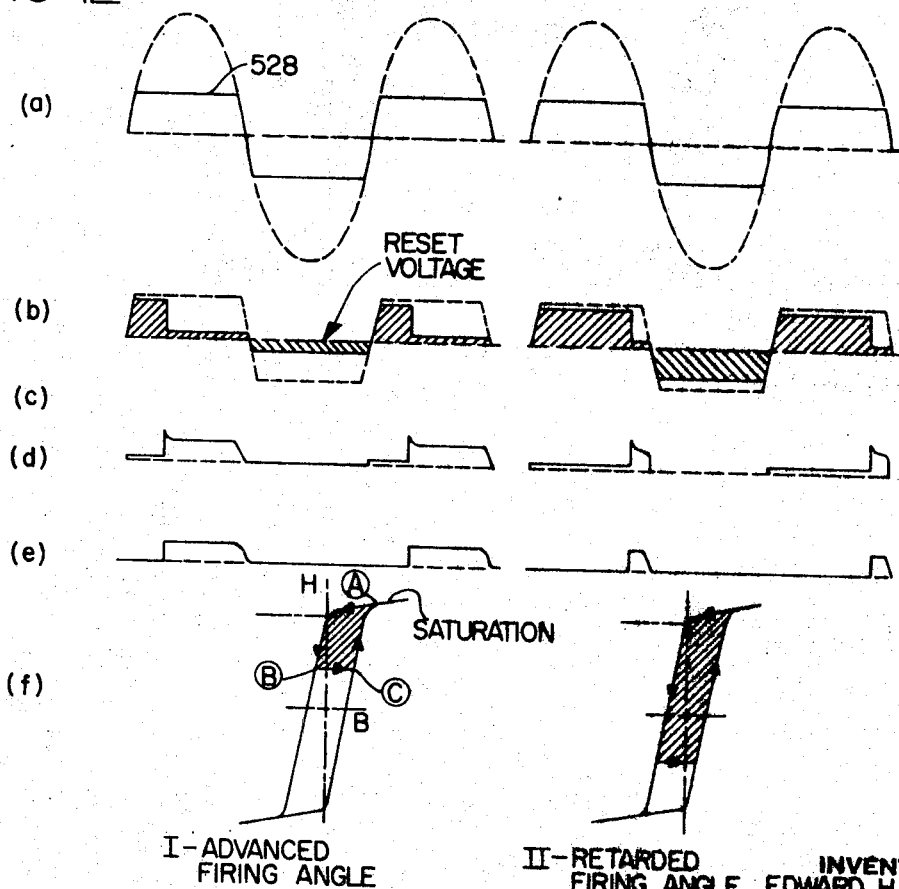
FIG. 12 shows a series of graphs illustrating the operation of the firing circuit of FIG. 10 at different firing angles.

The effect of reset voltage on SCR phase angle is shown in FIG. 12, where the waveforms in column I illustrate operation of the firing circuit for an advanced firing angle and those in column II illustrate SCR operation for a retarded firing angle. During the negative half-cycle of the firing voltage waveform in FIG. 12(a), which is prevented by diode 525 from having any effect on the firing circuit, a relatively low-amplitude reset voltage, indicated by the corresponding shaded portion of graph 12(b) of the voltage across inductor 526 drives the flux in magnetic core 527 to a level indicated by point B in graph (f). During the subsequent positive half-cycle of the firing voltage waveform 528, the current level through load resistor 523 is low, as indicated at the corresponding point in graph (d) of load resistor voltage, while the voltage across inductor 526 [graph (b)] is relatively high. As soon as magnetic core 527 saturates, a steep drop occurs in waveform (b), the voltage drop across winding 526, and the voltage across load resistor 523 undergoes a correspondingly steep rise, effecting conduction in four-layer diode 529 and thus producing a firing voltage waveform [FIG. 12(e)] across firing resistor 521. Note that the shaded areas under the consecutive positive and negative half-cycles of waveform 12(b) the voltage across inductor 526 are equal. This shows that the time integrals of the reset voltage waveform and the firing voltage waveform, respectively, are equal. Thus it can be seen that when the positive firing voltage waveform is applied to the firing circuit, the circuit will fire its associated SCR after an interval determined by the reset voltage level; the higher the reset voltage, the longer that interval will be.

(5.2) Firing voltage waveform generator

As previously mentioned, the firing voltage waveform is derived from the exciter output voltage because that voltage is in phase with the SCR anode voltages. However, the wide variation in exciter output voltage amplitude and, to some extent, the distortion in the exciter output shown in FIG. 14–III, make it impossible to use the exciter voltage directly to fire the SCR's. Accordingly, a firing voltage waveform generator is provided which is connected to receive $n$-phase output voltage from the exciter for generating firing voltage waveforms corresponding to each firing circuit, in-phase with the anode voltage at the rectifier controlled by that firing circuit. The generator includes a multiphase clipping circuit for clipping all of the firing voltage waveforms at the same clipping level. More particularly, the firing voltage waveform generator includes $n$ phase transformers ($n=3$), each having (1) a primary winding connected with a resistor in a series branch, each series branch being connected to receive one phase of exciter output voltage, (2) a limiting secondary winding, and (3) S further secondary windings, S being a number such that $nS$ equals the number of controlled rectifiers in the controlled rectifier unit; in this case, $S=2$. Importantly, all of the windings of each phase transformer are sufficiently closely coupled that a short circuit across one such secondary winding short circuits all of the remaining secondary windings of that phase transformer.

The firing voltage waveform generator further includes a clipping circuit connected in circuit with all of the limiting secondary windings for clipping the voltages across all of them to the above-mentioned clipping level. The clipping circuit includes, in the embodiment described, $n$ full-wave rectifiers ($n=3$), each connected to rectify the voltage across a respective limiting secondary winding and provide the rectified voltage at output terminals, and a voltage limiter connected in parallel with all of the $n$ full-wave rectifiers for clipping all of the rectified voltages, thereby clipping all of the limiting secondary winding voltages at the clipping level.

Figure 11:
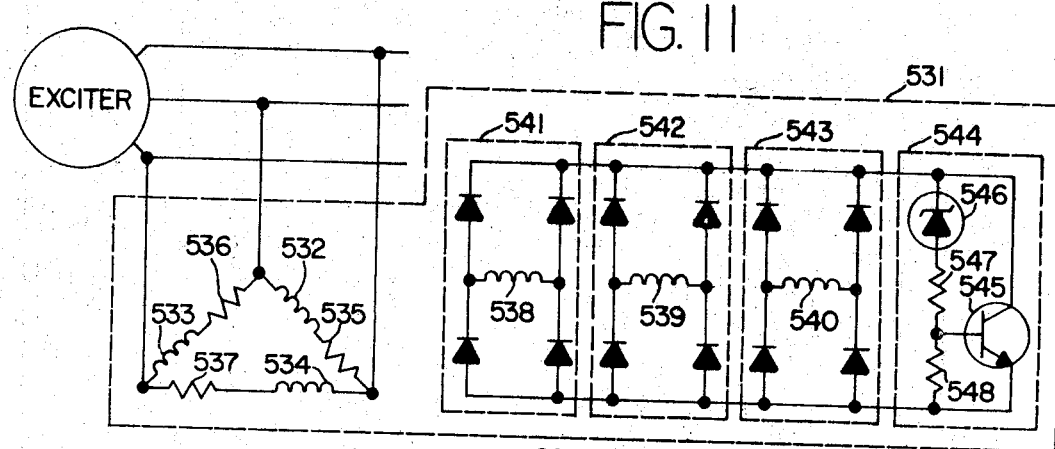
FIG. 11 is a circuit diagram of a firing voltage waveform generator.

Firing voltage waveform generator 531, shown in part in FIG. 11, includes three transformers having primary windings 532, 533 and 534 which are connected across respective pairs of exciter output terminals. Resistors 535, 536 and 537 are placed in series branches with respective transformer primary windings. Thus one phase of exciter output voltage is developed across each series branch consisting of a phase transformer primary winding (e.g., 532) and an associated resistor (e.g., 535). Each of the phase transformers has three secondary windings, and one secondary winding from each phase transformer, that is, limiting secondary windings 538, 539 and 540, are incorporated in respective diode bridge circuits 541, 542 and 543. Thus the respective phase voltages appearing on corresponding limiting secondary windings 538, 539 and 540 are each full-wave rectified and clipped by a clipping circuit 544. Clipping circuit 544 could be merely a zener diode. However, in order to handle greater current levels, a transistor 545 is connected through its emitter and collector terminals in parallel with all of the diode rectifiers 541 through 543. Zener diode 546 in series with resistors 547 and 548 is also connected in parallel with the diode rectifiers and the voltage between resistors 547 and 548 is applied to the base of transistor 545. To illustrate the operation of this circuit, the exciter output three-phase voltage is induced in each of the primary windings 532, 533, and 534 and appears across the respective secondary windings 538, 539 and 540. Each voltage phase is rectified by one of the diode bridge rectifiers 541, 542 and 543. The output voltages from these diode bridge rectifiers are not affected by the clipping until the voltage across the parallel diode rectifiers exceeds the breakdown voltage of Zener diode 546. When this occurs, current is caused to flow through Zener diode 546 into transistor 545, so that each secondary winding 538, 539 and 540 sees essentially a short circuit above the clipping level. The voltage waveform across each of the secondary windings 538 through 540 is thus essentially a clipped unipolar sinusoid.

As previously mentioned each of the three-phase transformers includes a primary winding and three secondary windings, one of which (a limiting secondary winding) is connected to clipping circuit 544. Since all of the windings of each phase transformer are closely coupled to each other, clipping of one secondary winding in each phase transformer results in a corresponding clipping in all of the remaining secondary windings at levels determined by the turns ratios of the respective secondary windings.

It will be apparent that the two SCR's in each series leg of rectifier unit 100 (e.g., SCR's 503 and 506) have to be fired 180° apart in phase. Assuming that the firing voltage in phase with the anode voltage applied to SCR's 503 and 506 appears on primary winding 532, firing voltage for these two SCR's may be derived from the two secondary windings 517 and 520 included in the same phase transformer as primary 532, which secondary windings are connected in opposite polarities.

It will thus be seen that the firing voltage waveform generator, the input to which is the exciter output voltage, generates two three-phase clipped firing waveforms which collectively correspond in phase to the anode voltages of the six SCR's in rectifier unit 100. The clipping level of all of these waveforms is identical and is maintained constant irrespective of exciter output voltage amplitude. Clipping occurs at a low enough voltage to exclude most of the distortion in the exciter voltage.

It will be recalled that feedback from the exciter output terminals was introduced into the Phase-Back Limit Regulator in order to compensate for the tendency of that regulator to advance the phase-back limit at higher alternator output levels. This can now be explained as follows: The waveform of FIG. 12(a) indicates that at low exciter output levels, then length of the flat portion of the firing voltage waveform 528 will be shorter than at very high exciter output levels. Stated another way, even though the clipping level of the firing voltage waveform remains absolutely constant, the area under the firing voltage waveform, or its time-integral, increases slightly at higher alternator output levels. Since the reset voltage is unaffected by by alternator output level, this will result in earlier firing, at high alternator output levels than at low levels for any given reset voltage. It is this undesired tendency of the phase-back limit which is compensated by the alternator output voltage feedback introduced into Phase-Back Limit Regulator 204.

In normal operation of the generator system, the output voltage from the particular regulator unit in control of the system is fed to both controlled rectifier units 100 and 100'. No provision is made for allocating field current between these rectifier units; the regulator assures proper operation no matter how the currents are allocated.

It will be apparent to those skilled in the art that various changes may be made in the above-described embodiments without departing from the scope and spirit of the invention which is limited only in accordance with the following claims.

I claim:

1. A rotating, alternating current generator system comprising:
   a generator, including a field winding, for providing an output voltage at its output terminals in accordance with the current in its field winding;
   an exciter, having a field winding, connected to supply current at its output terminals to the generator field winding in accordance with the current in the exciter field winding; and
   exciter field current supply means, including a control terminal, connected between the exciter output terminals and the exciter field winding for supplying to the exciter field winding, from the exciter output terminals, an amount of current determined by a signal at said control terminal, which amount of current is the entire current supplied to the exciter field winding.

2. A rotating, alternating current generating system as defined in claim 1 including regulator means responsive to a measurable variable within the generator system for providing a control signal at said control terminal to regulate the exciter field current supplied by the exciter field current supply means in accordance with said measurable variable.

3. A generator system as defined in claim 2 wherein said excited field current supply means includes a controlled rectifier unit, and firing circuit means responsive to the exciter output voltage and to said control voltage for firing said controlled rectifier unit at a firing angle determined by said control voltage.

4. A generator system as defined in claim 3 wherein said firing circuit means includes firing waveform generating means responsive to the voltage at said exciter output terminal for supplying to the firing circuit means a firing voltage waveform which is essentially independent of the exciter output voltage.

5. A rotating, alternating current generator system comprising:
   a generator, including a field winding, for providing an output voltage at its output terminals in accordance with the current in its field winding;
   an n-phase exciter, having a field winding, connected to supply current at its output terminals to the generator field winding in accordance with the current in the exciter field winding;
   regulator means responsive to a measurable variable within the generating system for providing a control voltage in accordance with said variable to regulate the generator system; and
   an n-phase, full wave controlled rectifier unit connected between the exciter output terminals and the exciter field winding for supplying the entire current in the exciter field winding from the exciter output terminals, said controlled rectifier unit including
      (1) a plurality of controlled rectifiers for full wave rectifying the n-phase exciter output voltage;
      (2) firing circuit means including a firing circuit corresponding to each controlled rectifier and responsive to said control voltage for firing its controlled rectifier at a phase angle determined by said control voltage; and a firing voltage waveform generator responsive to the n-phase exciter output voltage for providing a firing waveform for each firing circuit which is essentially independent of exciter output voltage amplitude and distortion content.

6. A generator system as defined in claim 5 wherein said firing voltage waveform generator includes:
   n-phase transformers, each having (1) a primary winding connected with a resistor in a series branch, each series branch being connected to receive one phase of exciter output voltage, (2) a limiting secondary winding, and (3) S further secondary windings, S being a number such that nS equals the number of said controlled rectifiers, all of the secondary windings of each phase transformer being sufficiently closely coupled that a short circuit across one such secondary windings short circuits all of the remaining secondary windings;
   a clipping circuit connected in circuit with all of the limiting secondary windings for clipping the voltage across all of said limiting secondary windings to said clipping level; and
   means connecting each further secondary winding to supply a firing voltage waveform to a corresponding firing circuit.

7. A generator system as defined in claim 6 wherein said clipping circuit includes:
   n full wave rectifiers, each connected to rectify the voltage across a respective limiting secondary winding and provide the rectified voltage at output terminals; and
   a voltage limiter connected in parallel with all of the n full wave rectifiers for clipping all of the rectified voltages, and thereby all of the limiting secondary winding voltages, at said clipping level.

8. A geneartor system as defined in claim 6 wherein each firing circuit comprises:
   a series circuit including a variable impedance, a load resistor, one of said further secondary windings, and a diode for permitting current flow in the series circuit in only one direction;

a firing resistor for applying firing voltage developed across said load resistor to the controlled rectifier associated with the firing circuit for firing said controlled rectifier; and a unilateral switch connected between the load resistor and the firing resistor for preventing the voltage across the load resistor from appearing across the firing resistor until said voltage exceeds the breakdown voltage of the unilateral switch.

9. A generator system as defined in claim 3 wherein said regulator means includes a plurality of regulators, each responsive to a respective measurable variable within the generator system for producing a control signal in accordance with that variable, said generator system including at least one analog OR-gate for supplying to the control terminal of the exciter current supply means that one of the control signals which has the greatest amplitude.

10. A generator system as defined in claim 9 wherein said regulators include:

a main control regulator responsive to generator output voltage for producing a control signal in accordance with the deviation of generator output voltage from a desired value, to counteract such deviation and thereby maintain constant generator output voltage; and an undervoltage limit regulator responsive to exciter output voltage for producing a control signal in accordance therewith to prevent it from falling below a predetermined desired value.

11. A generator system as defined in claim 10 wherein said regulators include:

a current limit regulator responsive to exciter output current for producing a control signal in accordance with the magnitude thereof to prevent said magnitude from rising above a predetermined value;

an underexcited reactive current limit regulator responsive to the reactive component of generator output current for producing a control signal in accordance with the magnitude thereof to prevent said magnitude from rising above a predetermined level with respect to the real generator output current; and a phase-back limit regulator responsive to exciter output voltage for producing a control signal corresponding to a constant maximum firing angle of the controlled rectifier unit for all values of excited output voltage.

12. A generator system as defined in claim 3 including a non-linear rate feedback circuit for supplying to said regulator means, a feedback signal proportional to the time-derivative of the exciter output voltage multiplied by a non-linear function of said exciter output voltage which decreases in magnitude for exciter output voltage above a predetermined magnitude, for maintaining the stability of said generator system under all operating conditions.

13. A generator system as denfied in claim 12 wherein said generator system includes a source of D-C voltage proportional to the exciter output voltage and said non-linear rate feedback circuit includes a non-linear function circuit connected in parallel with said source, and a differentiating circuit connected between said non-linear function circuit and the regulator means.

14. A generator system as defined in claim 13 wherein said non-linear function circuit contains two parallel resistance branches, one of which contains a Zener diode connected to permit current flow in its resistive branch only when the voltage produced by said D-C voltage source exceeds its Zener voltage, and said differentiating circuit contains a capacitor.

15. A generator system as defined in claim 11 wherein said firing circuit means includes firing waveform generating means responsive to exciter output terminal voltage for supplying to the firing circuit means a firing voltage waveform which is essentially independent of exciter output terminal voltage.

16. A generator system as defined in claim 1 wherein the exciter field current supply means is connected to receive exciter output voltage, said system including current boost means connected to current transformers, the primary windings of which are in series with the exiter output terminals, for producing a D-C electrical output having a predetermined ratio to the exciter output current, said current boost means being connected to supply current to the exciter field winding whenever said electrical output exceeds the electrical output of the exciter current supply means, said predetermined ratio being selected so that exciter field current is supplied by the current boost means only when the exciter output voltage tends to become too low to sustain exciter self-excitation.

17. A generator system as defined in claim 1 wherein the exciter current supply means is connected to receive exciter output voltage, said system including current boost rectifier means connected to a current transformer, the primary winding of which is connected in series with the exciter output terminals, said current boost rectifier means being connected in series with the exciter field current supply means for supplying D-C booster current to the exciter field winding proportional to exciter output current in the proportion 1:$m$, $m$ being such that said booster current is less than the exciter field current necessary to produce said exciter output current except when the exciter output voltage drops below a level necessary for the maintenance of exciter self-excitation.

18. A generator system as defined in claim 17 wherein said current transformers have transformer cores which saturate, thereby limiting the current supplied to the current boost rectifier unit, at a level at which the current boost rectifier unit is supplying a predetermined level of exciter field current.

19. A generator system as defined in claim 18 wherein said exciter has n phases, said current boost rectifier means is an n-phase, full wave diode bridge rectifier, and said transformer is an n-phase transformer connected to supply n-phase current to the diode bridge rectifier.

20. A generator system as defined in claim 3 wherein the exciter current supply means is connected to receive exciter output voltage including an n-phase, full wave diode rectifier connected to an n-phase current transformer, the $n$ primary windings of which are connected in series with respective ones of the $n$ exciter output terminals, said diode rectifier being connected in series with the controlled rectifier unit for supplying D-C booster current to the exciter field winding proportional to the exciter output current in the proportion 1:$m$, $m$ being such that said booster current is less than the exciter field current necessary to produce said exciter output current except when the exciter output voltage falls below a level necessary to sustain exciter self-excitation, said current transformer having magnetic cores constructed to saturate and thereby limit the current supplied to said diode rectifier at a predetermined level.

21. A generator system as defined in claim 1 including a second exciter field current supply means connected in parallel with the first exciter current supply means, each of the first and second exciter current supply means being capable of supplying the entire current in the exciter field winding; and first and second transformers, each connected to supply exciter output voltage to a respective exciter current supply means, each said transformer having a primary winding connected across said exciter output terminals and a secondary winding connected to the respective exciter current supply means, the electrical impedance between the first transformer secondray winding and the second transformer secondary winding being high enough so that a short circuit across one of said secondary windings is incapable of causing failure of the exciter current supply means at the other of said secondary windings.

22. A generator system as defined in claim 5 including a second controlled rectifier unit connected in parallel with the first controlled rectifier unit, each of said first and second controlled rectifier units being an n-phase rectifier unit capable of supplying the entire current in the exciter field winding; and first and second n-phase transformers, each having n primary windings connected between pairs of exciter output terminals, and n secondary windings connected to a corresponding controlled rectifier unit; the magnetic coupling between the primary and secondary windings of each transformer being such that the electrical impedance between said first and second controlled rectifier units, through said first and second transformers, is great enough to prevent a short circuit across one controlled rectifier unit from causing a short circuit in the other controlled rectifier unit.

23. A generator system as defined in claim 11, including:
a second exciter field current supply means connected in parallel with the first exciter supply means, each of said exciter current supply means being connected to receive exciter output voltage, each of the first and second exciter current supply means being capable of supplying the entire current in the exciter field winding; and
first and second transformers, each connected to supply exciter output voltage to a respective exciter current supply means, each said transformer having a primary winding connected across said exciter output terminals and secondary winding connected to its respective exciter current supply means, the electrical impedance between the secondary winding of the first and second transformers being high enough so that a short circuit across one exciter field current supply means does not affect operation of the other field current supply means; and
first and second current boost rectifier means connected in series with the respective first and second exciter field current supply means, each connected to a current transformer, the primary winding of which is connected in series with the exciter output terminals, each current boost rectifier means supply D-C booster current to the exciter field winding proportional to the exciter output current in the proportion 1:$m$, $m$ being such that said booster current is less than the exciter field winding current necessary to produce said exciter output current except when the exciter output voltage drops below a predetermined level.

24. In a rotating, alternating current generator system including:
a generator;
an input field winding for controlling, by the current therein, the generator output voltage;
input field current supply means for deriving current from within the generating system and supplying an amount of input field current determined by a control signal applied thereto to the input field winding; and
a plurality of regulators, each for providing a control signal for controlling the input field current in accordance with a measurable variable in the generator system; the improvement comprising at least one analog OR-gate for applying to the input field current supply means that one of said control signals having the greatest amplitude.

25. In a generator system including:
a generator,
an exciter for supplying generator field current,
a controlled rectifier unit connected to a source of voltage within said generator system for supplying D-C exciter field current to said exciter,
firing circuit means responsive to said source of voltage and to a D-C control voltage for firing the controlled rectifier unit at a phase angle determined by said D-C control voltage,
a regulator for supplying a D-C control voltage to the firing circuit means to control the generator system, the improvement comprising a phase-back limit regulator for producing a D-C control voltage, the amplitude of which corresponds to a constant maximum rectifier phase angle for all values of voltage supplied by said source of voltage; and
an analog OR-gate connected to receive the respective D-C control voltages from the regulator and the phase-back limit regulator for applying the D-C control voltage having the greatest magnitude to the firing circuit means to control the generator system, so that the phase-back limit regulator assumes control of the generator system when the control voltage produced thereby becomes greater in magnitude than that produced by said regulator, preventing the rectifier unit phase angle from exceeding said constant maximum rectifier phase angle.

26. For use in an n-phase generator system including:
a generator,
an n-phase exciter for supplying generator field current, and
a plurality of controlled rectifiers connected to form an n-phase controlled rectifier unit for rectifying part of the exciter output to supply D-C field current to the exciter field winding in accordance with the phase angles of said controlled rectifiers, the improvement comprising:
firing circuit means for firing each cotrolled rectifier at a phase angle determined by a D-C control voltage, irrespective of wide magnitude variations and substantial distortion in the exciter output voltage, said firing circuit means including a firing circuit corresponding to each controlled rectifier for firing such controlled rectifier at a phase angle determined by said D-C control voltage; and
a firing voltage waveform generator connected to receive n-phase output voltage from the exciter for generating firing voltage waveforms corresponding to each firing circuit in-phase with the anode voltage at the rectifier controlled by that firing circuit, said generator including multiphase clipping means for clipping all of said firing voltage waveforms at the same clipping level.

27. Firing circuit means as defined in claim 26 wherein said firing voltage waveform generator includes:
n-phase transformers, each having (1) a primary winding connected with a resistor in a series branch, each series branch being connected to receive one phase of exciter output voltage, (2) a limiting secondary winding, and (3) S further secondary winding, S being a number such that nS equals the number of said controlled rectifiers, all of the windings of each phase transformer being sufficiently closely coupled that a short circuit across one such secondary winding short circuits all of the remaining secondary windings;
a clipping circuit connected in circuit with all of the limiting secondary windings for clipping the voltages across all of said limiting secondary windings to said clipping level; and
means connecting each further secondary winding to supply a firing voltage waveform to a corresponding firing circuit.

28. Firing circuit means as defined in claim 27 wherein said clipping circuit includes:
n full-wave rectifiers, each connected to rectify the voltage across a respective limiting secondary winding and provide the rectified voltage at output terminals; and
a voltage limiter connected in parallel with all of the n full-wave rectifiers for clipping all of the rectified voltages, thereby clipping all of the limiting secondary winding voltages at said clipping level.

29. Firing circuit means as defined in claim 28 wherein said voltage limiter includes at least one transistor connected through its emitter and collector terminals in parallel with all of the n full wave rectifiers, and a series control branch comprising a Zener diode and a resistor connected in parallel with said transistor, the transistor base terminal being connected to said series control branch between said resistor and Zener diode for turning said transistor on when its collector-to-emitter voltage exceeds the Zener breakdown voltage of the Zener diode, which is equal to said clipping level.

30. Firing circuit means as defined in claim 27 wherein each firing circuit comprises:
   a series circuit including a variable impedance, a load resistor, one of said further secondary windings, and a diode for permitting current flow in the series circuit in only one direction;
   a firing resistor for applying firing voltage developed across said load resistor to the controlled rectifier associated with the firing circuit for firing said controlled rectifier; and
   a unilateral switch connected between the load resistor and the firing resistor for preventing the voltage across the load resistor from appearing across the firing resistor until said voltage exceeds the breakdown voltage of the unilateral switch.

31. Firing circuit means as defined in claim 30 including a capacitor connected in parallel with said load resistor for providing a current surge upon firing of the controlled rectifier, thereby improving the rise time thereof upon firing.

32. Firing circuit means as defined in claim 31 wherein said variable impedance is an inductor mangetically coupled to a square-hysteresis-magnetic core; said firing circuit including a reset winding magnetically coupled with said magnetic core for producing a reset flux therein in accordance with said D-C control voltage.

33. In an electric apparatus having input terminals for receiving input current and output terminals for supplying output current and characterized by a current transfer ratio equal to the value of said output current divided by the value of said input current, a current boost unit for providing input current to said apparatus in the event that said current transfer function falls below a predetermined value, said current boost unit comprising: a rectifier connected in series with said input terminals for supplying D-C current thereto, and a current transformer having a primary winding in series with said terminals and a secondary winding connected to supply input current to said rectifier, said current transformer having a turns ratio such that the D-C current supplied by the rectifier is greater than said input current only when the current transfer ratio is below said predetermined value, said current transformer having a transformer core which saturates, thereby limiting the current supplied to the rectifier, at a level at which the current supplied by the rectifier is equal to a maximum desired value.

34. A generator system as defined in claim 1 including a second exciter field current supply means connected in parallel with the first exciter current supply means, each of the first and second exciter current supply means being capable of supplying the entire current in the exciter field winding; and impedance means connected between said first and second exciter field current supply means for providing sufficient electrical impedance between them that a short circuit across one exciter current supply means is incapable of causing failure of the other exciter current supply means.

References Cited
UNITED STATES PATENTS

| | | | |
|---|---|---|---|
| 2,879,465 | 3/1959 | Wood | 322—27 |
| 2,913,656 | 11/1959 | Bliss | 322—25 |
| 3,303,412 | 2/1967 | Gately | 323—4 |
| 3,351,843 | 11/1967 | Tipton | 322—28 |

ORIS L. RADER, Primary Examiner

H. HUBERFELD, Assistant Examiner

U.S. Cl. X.R.

322—27, 28, 73